US008306217B2

(12) United States Patent
Shirai et al.

(10) Patent No.: US 8,306,217 B2
(45) Date of Patent: *Nov. 6, 2012

(54) CRYPTOGRAPHIC PROCESSING APPARATUS AND CRYPTOGRAPHIC PROCESSING METHOD, AND COMPUTER PROGRAM

(75) Inventors: Taizo Shirai, Tokyo (JP); Kyoji Shibutani, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/206,803

(22) Filed: Aug. 10, 2011

(65) Prior Publication Data

US 2011/0293089 A1 Dec. 1, 2011

Related U.S. Application Data

(63) Continuation of application No. 12/232,352, filed on Sep. 16, 2008, now Pat. No. 8,031,866, which is a continuation of application No. 10/951,371, filed on Sep. 28, 2004, now Pat. No. 7,433,470.

(30) Foreign Application Priority Data

Sep. 30, 2003 (JP) ................................. 2003-339364

(51) Int. Cl.
*H04K 1/00* (2006.01)
*H04L 9/32* (2006.01)
(52) U.S. Cl. .............................. 380/28; 380/29; 713/189
(58) Field of Classification Search ............... 380/28–30, 380/37, 44, 46; 713/189–194
See application file for complete search history.

(56) References Cited

U.S. PATENT DOCUMENTS

| 4,078,152 | A | 3/1978 | Tuckerman, III |
| 5,949,884 | A | 9/1999 | Adams et al. |
| 7,120,696 | B1* | 10/2006 | Au et al. ....................... 709/229 |
| 7,194,090 | B2 | 3/2007 | Muratani et al. |
| 7,433,470 | B2 | 10/2008 | Shirai et al. |
| 8,031,866 | B2* | 10/2011 | Shirai et al. ..................... 380/28 |

FOREIGN PATENT DOCUMENTS

JP   A 2002-23623   1/2002

(Continued)

OTHER PUBLICATIONS

Japanese Office Action in corresponding Japanese Application No. 2003-339364 dated Feb. 22, 2010.

(Continued)

*Primary Examiner* — Hosuk Song
(74) *Attorney, Agent, or Firm* — Finnegan, Henderson, Farabow, Garrett & Dunner, L.L.P.

(57) ABSTRACT

There is provided a highly secure cryptographic processing apparatus and method where an analysis difficulty is increased. In a Feistel type common key block encrypting process in which an SPN type F function having a nonlinear conversion section and a linear conversion section is repeatedly executed a plurality of rounds. The linear conversion process of an F function corresponding to each of the plurality of rounds is performed as a linear conversion process which employs an MDS (Maximum Distance Separable) matrix, and a linear conversion process is carried out which employs a different MDS matrix at least at each of consecutive odd number rounds and consecutive even number rounds. This structure makes it possible to increase the minimum number (a robustness index against a differential attack in common key block encryption) of the active S box in the entire encrypting function.

41 Claims, 17 Drawing Sheets

FOREIGN PATENT DOCUMENTS

| JP | A 2002-91295 | 3/2002 |
|----|--------------|--------|
| JP | A 2002-91297 | 3/2002 |

OTHER PUBLICATIONS

Taizo Shirai et al., "Improving Immunity of Feistel Ciphers against Differential Cryptanalysis by Using Multiple MDS Matrices," LNCS, Feb. 2004, vol. 3017, pp. 260-278.

Toshiyuki Kohnosu et al., "One Consideration about the Decoding Method to the Burst Error of a 2-value-developed Reed-Solomon Code," Information and Communication Engineers, May 26, 1992, vol. 92, No. 57, pp. 35-39.

Kenji Okuma et al., "A Nest Type SPN Structure," Information and Communication Engineers, Mar. 17, 2000, vol. 99, No. 702, pp. 99-104.

\* cited by examiner

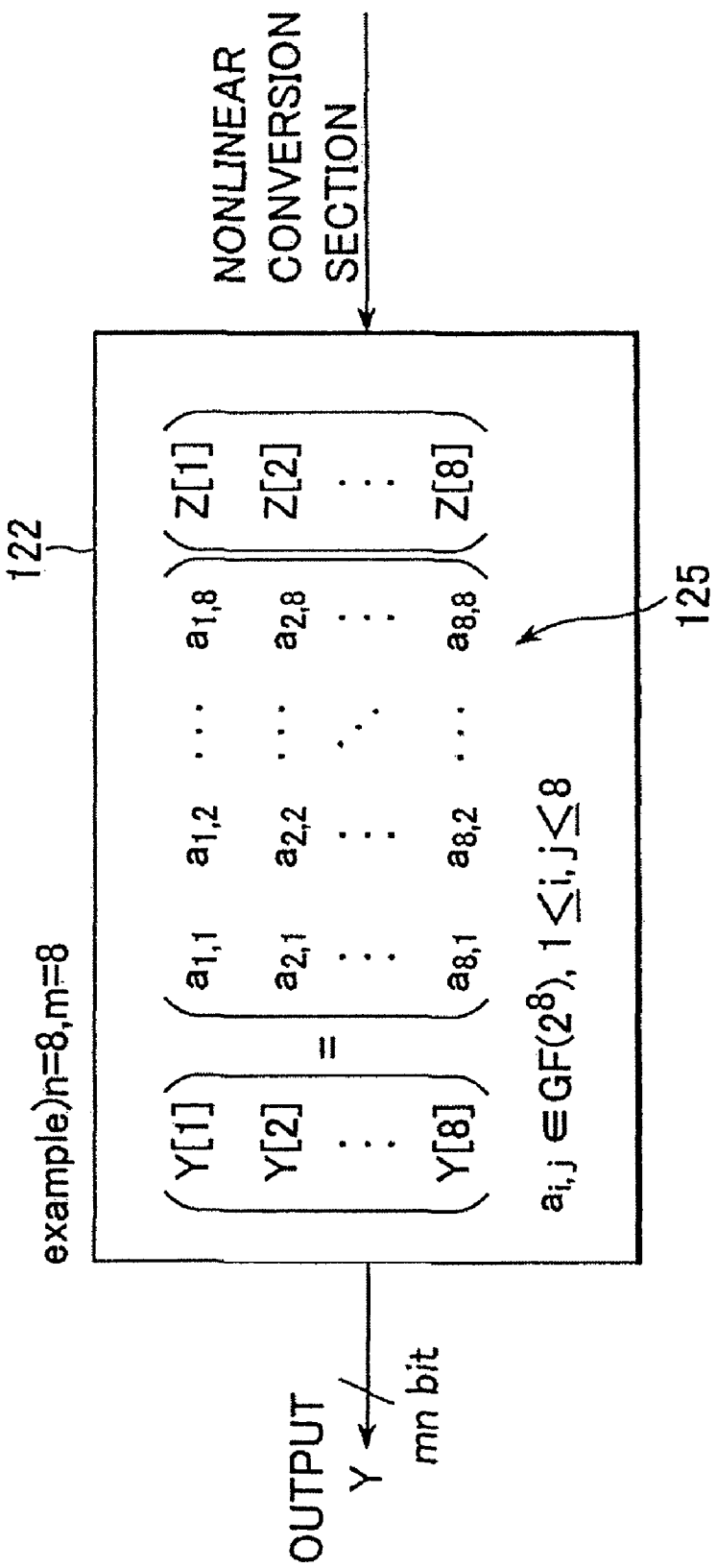

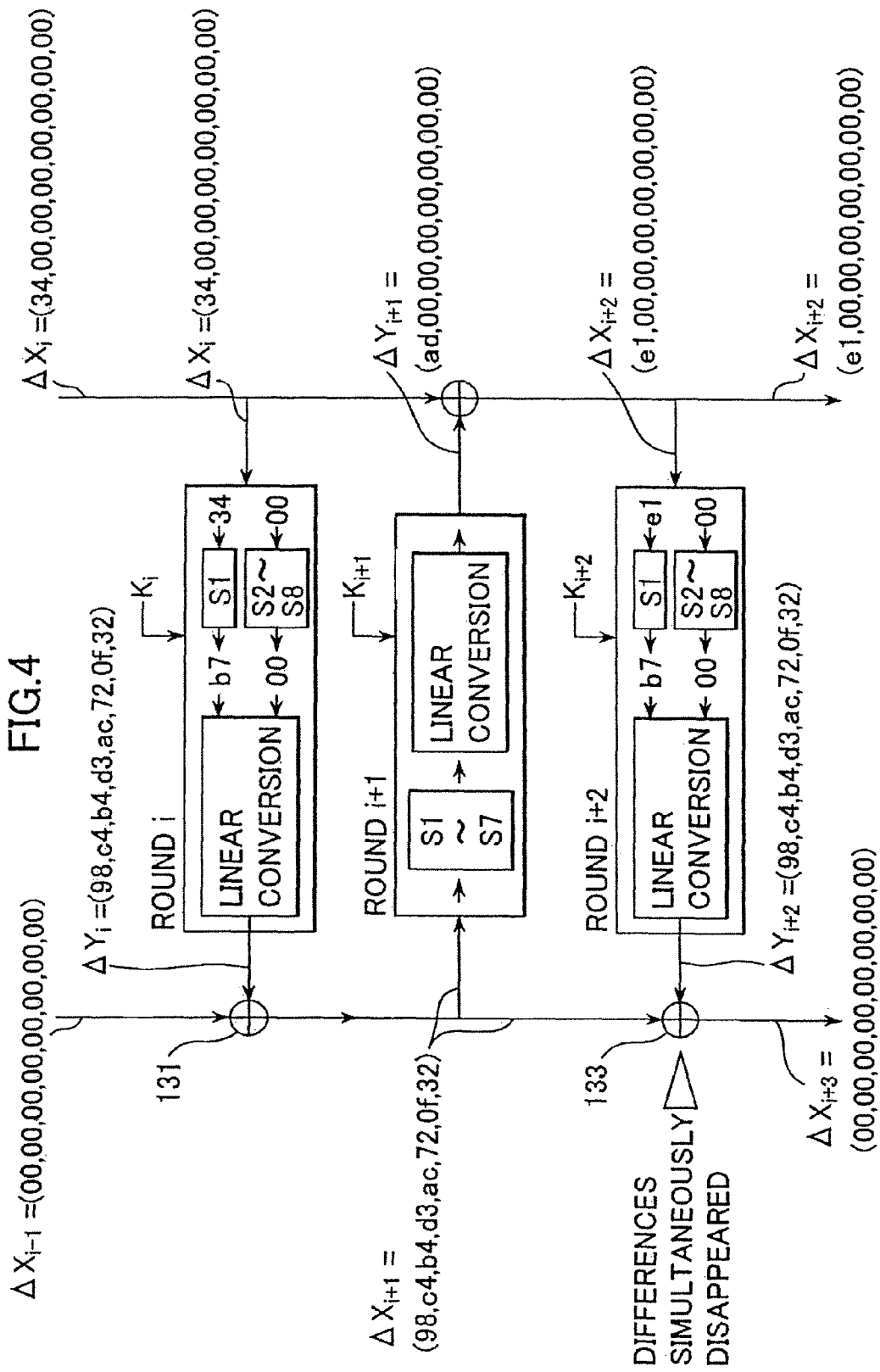

FIG.8 example) $n = 8, m = 8$ $$\begin{pmatrix} 9d & b4 & d3 & 5d & 84 & ae & ec & b9 \\ 29 & 34 & 39 & 60 & 5c & 81 & 25 & 13 \\ 67 & 6a & d2 & e3 & 4b & db & 9d & 4 \\ 8e & d7 & e6 & 1b & 8b & 9e & 3a & 91 \\ d9 & e5 & 4d & dd & c6 & 5 & f0 & ad \\ 2a & f7 & 67 & 72 & b1 & 7 & f2 & 27 \\ 42 & e6 & a0 & 4 & f1 & 4 & 7d & 8c \\ 55 & 63 & fa & 51 & c & d9 & 28 & d6 \end{pmatrix}$$

IN THE CASE OF x=6, n=8, AND m=8

CRYPTOGRAPHIC PROCESSING APPARATUS AND CRYPTOGRAPHIC PROCESSING METHOD, AND COMPUTER PROGRAM

CROSS REFERENCES TO RELATED APPLICATIONS

This is a continuation of application Ser. No. 12/232,352, filed Sep. 16, 2008 now U.S. Pat. No. 8,031,866, which is a continuation of application Ser. No. 10/951,371, filed Sep. 28, 2004 now U.S. Pat. No. 7,433,470, which claims priority to Application No. 2003-339364 filed on Sep. 30, 2003 in Japan, the contents of each of which are incorporated herein by reference.

BACKGROUND OF THE INVENTION

1. Field of the Invention

The present invention relates to a cryptographic processing apparatus and a cryptographic processing method, and a computer program, more particularly to a cryptographic processing apparatus and a cryptographic processing method, and a computer program, which improve robustness against a differential analysis known as a decryption process or an attack process.

2. Description of the Related Art

In these days, as network communications and electronic commerce have been developed, there is an important issue in ensuring security in communications. One method for ensuring security is an encrypting technology. In fact, communications using a variety of encrypting methods are carried out at present.

For example, a system is put into practical use where an encryption processing module is embedded in a small apparatus, such as an IC card, data transmission and reception are carried out between the IC card and a reader/writer as a data read/write apparatus, and an authentication process and encryption/decryption of transmission/reception data are carried out.

There are various encryption processing algorithms, which can roughly be classified into a public key cryptosystem where an encrypting key and a decryption key are set up as different keys, for example, a public key and a secret key, and a common key cryptosystem where an encrypting key and a decryption key are set up as common keys.

There are also various algorithms in the common key cryptosystem. One of them is a system where a plurality of keys are generated based on a common key and it repeats and performs a data conversion process on a block-by-block basis (64 bits, 128 bits, etc.) using the thus generated plurality of keys. A typical system of the algorithms employing such a key generation system and a data conversion process is a common key block cryptosystem.

An algorithm of the typical common key block encryption may be, for example, a DES (Data Encryption Standard) algorithm as U.S. standard encryption, which is used widely in various fields.

The algorithms for the common key block encryption represented by the DES are mainly divided into a round function section which performs conversion of input data, and a key schedule section which generates a key applied at each round of the round function (F function) section. The round key (subkey) applied at each round of the round function section is inputted into the key schedule section and generated based on one master key (main key), and applied in each round function section.

However, in such common key encryption process, there is a drawback that the key and the encryption algorithms may be leaked by way of decryption. As a typical method of the decryption or an attack method, the differential analysis (also referred to as the differential decryption system or a differential attack) is known, which analyzes an application key in each round function by analyzing a majority of input data (plain text) and their output data (cipher text) which have certain differences.

Ease of key analysis by way of decryption means that the security of the encryption processing is low. In a conventional DES algorithm, a process (conversion matrix) applied in a linear conversion section of the round function (F function) section is the same at the round of each step, which makes it easy to perform the differential analysis. As a result, the key analysis can be performed without much difficulty, thereby posing the drawback in the application of such encryption process.

SUMMARY OF THE INVENTION

It is desirable to provide a cryptographic processing apparatus and a cryptographic processing method, and a computer program, which realize a common key block encryption algorithm highly robust against a differential analysis.

Further it is desirable to provide, by carrying out a linear conversion process employing a conversion matrix different for each round, a cryptographic processing apparatus and a cryptographic processing method, and a computer program, which realize the common key block encryption algorithm highly robust against the differential analysis.

In view of the above-mentioned drawback, the present invention is made.

According to a first aspect of the present invention, there is provided a cryptographic processing apparatus which performs a Feistel type common key block encrypting process, and is configured such that an SPN type F function having a nonlinear conversion section and a linear conversion section is repeatedly carried out a plurality of rounds; the linear conversion section of the F function corresponding to each of the above-mentioned plurality of rounds is adapted to perform a linear conversion process which employs an MDS (Maximum Distance Separable) matrix; and to perform a linear conversion process which employs different MDS matrices at least at each of consecutive odd number rounds and consecutive even number rounds.

Further, in an embodiment of the cryptographic processing apparatus in accordance with the present invention, the linear conversion section of the above-mentioned F function is adapted to perform a linear conversion process which employs different MDS matrices in all even number rounds and all odd number rounds, respectively.

Further, in an embodiment of the cryptographic processing apparatus in accordance with the present invention, the algorithm of the above-mentioned Feistel type common key block encrypting process is an encrypting algorithm with the number of rounds of 2r, and the linear conversion section of the above-mentioned F function is adapted to perform a linear conversion process which employs r types of different MDS matrices one by one in all r even number rounds and all r odd number rounds.

Further, in an embodiment of the cryptographic processing apparatus in accordance with the present invention, the algorithm of the above-mentioned Feistel type common key block encrypting process is the encrypting algorithm of the number of rounds 2r, and the linear conversion section of the above-mentioned F function is adapted to perform a linear conversion process in which q (where 2≦q<r) types of different MDS matrices are repeatedly employed one by one in all the r even number rounds and all the r odd number rounds.

Further, in an embodiment of the cryptographic processing apparatus in accordance with the present invention, the linear conversion section of the above-mentioned F function is adapted to perform a linear conversion process with respect to an input of n bits outputted by respective m nonlinear conversion sections, or mn bits in total, and each of different plural MDS matrices applied in the linear conversion section of the above-mentioned F function is set up as an MDS matrix in such a way that a matrix having m column vectors arbitrarily chosen from the column vectors included in the above-mentioned plural MDS matrices is linearly independent.

Further, in an embodiment of the cryptographic processing apparatus in accordance with the present invention, the linear conversion section of the above-mentioned F function is adapted to perform a linear conversion process with respect to the input of n bits outputted by respective m nonlinear conversion sections, or mn bits in total, and each of the different plural MDS matrices applied in the linear conversion section of the above-mentioned F function is set up as an MDS matrix in such a way that a matrix having m column vectors arbitrarily chosen from the column vectors included in the above-mentioned plurality of MDS matrices is an MDS matrix.

Further, in an embodiment of the cryptographic processing apparatus in accordance with the present invention, each of the different plural MDS matrices applied in the linear conversion section of the above-mentioned F function has a matrix having the column vectors extracted from a matrix M' having row vectors chosen from an MDS matrix M containing all the components that included in the above-mentioned different MDS matrix.

Further, in an embodiment of the cryptographic processing apparatus in accordance with the present invention, each of the different plural MDS matrices applied in the linear conversion section of the above-mentioned F function is an MDS matrix generated based on a Reed Solomon code generation matrix.

Further, according to a second aspect of the present invention, there is provided a cryptographic processing method of performing a Feistel type common key block encrypting process wherein an SPN type F function of performing a nonlinear conversion process and a linear conversion process is repeatedly carried out a plurality of rounds. Further, the linear conversion process of the F function corresponding to each of the above-mentioned plurality of rounds performs a linear conversion process which employs the MDS (Maximum Distance Separable) matrix, and performs a linear conversion process which employ different MDS matrices at least at each of the consecutive odd number rounds and the consecutive even number rounds.

Further, in an embodiment of the cryptographic processing method in accordance with the present invention, the linear conversion process of the F function corresponding to each of the above-mentioned plurality of rounds performs a linear conversion process in such a way that different MDS matrices are employed in all the even number rounds and all the odd number rounds, respectively.

Further, in an embodiment of the cryptographic processing method in accordance with the present invention, in the above-mentioned cryptographic processing method, the Feistel type common key block encrypting process with the number of rounds 2r is performed; and the linear conversion process of the F function corresponding to each of the above-mentioned plurality of rounds performs a linear conversion process which employs r types of different MDS matrices one by one in all the r even number rounds and all the r odd number rounds.

Further, in an embodiment of the cryptographic processing method in accordance with the present invention, as for above-mentioned cryptographic processing method, the Feistel type common key block encrypting process with the number of rounds 2r is performed; and the linear conversion process of F function corresponding to each of the above-mentioned plurality of rounds performs a linear conversion process which employs q (where 2≦q<r) types of different MDS matrices one by one repeatedly in all the r even number rounds and all the r odd number rounds.

Further, in an embodiment of the cryptographic processing method in accordance with the present invention, the linear conversion process of the F function corresponding to each of the above-mentioned plurality of rounds is a linear conversion process for an input of n bits outputted by each of m nonlinear conversion sections, or mn bits in total; and each of the different plural MDS matrices applied in the linear conversion process of the F function corresponding to each of the above-mentioned plurality of rounds is a MDS matrix wherein a matrix having m column vectors arbitrarily chosen from the column vectors included in the above-mentioned plural MDS matrices is linearly independent.

Further, in an embodiment of the cryptographic processing method in accordance with the present invention, the linear conversion process of the F function corresponding to each of the above-mentioned plurality of rounds is a linear conversion process for an input of n bits outputted by each of m nonlinear conversion sections, or mn bits in total; and each of the different plural MDS matrices applied in the linear conversion process of the F function corresponding to each of the above-mentioned plurality of rounds is a MDS matrix wherein a matrix having m column vectors arbitrarily chosen from the column vectors included in the above-mentioned plural MDS matrices is an MDS matrix.

Further, in an embodiment of the cryptographic processing method in accordance with the present invention, each of the different plural MDS matrices applied in the linear conversion process of the F function corresponding to each of the above-mentioned plurality of rounds has a matrix having column vectors extracted from matrix M' having row vectors chosen from a MDS matrix M containing all the components which included in the above-mentioned plural MDS matrices.

Further, in an embodiment of the cryptographic processing method in accordance with the present invention, each of the different plural MDS matrices applied in the linear conversion section of the above-mentioned F function is a MDS matrix generated based on a Reed Solomon code generation matrix.

Further, according to a third aspect of the present invention, there is provided a computer program which performs a Feistel type common key block encrypting process, wherein an SPN type F function for performing a nonlinear conversion process and a linear conversion process is repeatedly carried out a plurality of rounds; and the linear conversion process of the F function corresponding to each of the plurality of rounds performs a linear conversion process which employs the MDS (Maximum Distance Separable) matrix, and performs a linear conversion process which employ different MDS matrices at least at each of the consecutive odd number rounds and the consecutive even number rounds.

In addition, the computer program in accordance with the present invention is a computer program which can be provided to a computer system which can perform various program codes, for example, by way of a storage medium provided in a computer-readable form, a communication media, a recording media, such as for example, a CD, an FD, an MO, etc., or a communication media, such as a network. By providing such a program in a computer-readable form, a process according to the program is realized on a computer system.

Other aspects, features, and advantages of the present invention will be apparent from the following detailed description based on examples and the accompanying drawings of the present invention as described later. In addition, in this specification, by system we mean a logical collective structure of a plurality of apparatuses, which are not always in the same casing.

According to the structure of the embodiments of the present invention, in the Feistel type common key block encrypting process in which the SPN type F function having the nonlinear conversion section and the linear conversion section is repeatedly executed a plurality of rounds, the linear conversion process of the F function corresponding to each of the plurality of rounds is performed as the linear conversion process which employs the MDS (Maximum Distance Separable) matrix, and the linear conversion process is carried out which employs the different MDS matrix at least at each of the consecutive odd number rounds and the consecutive even number rounds, whereby the possibility of occurrence of simultaneous difference cancellations caused by an active S box is reduced or removed, and it becomes possible to increase the minimum number (a robustness index against the differential attack in the common key block encryption) of the active S box in the entire encrypting function. In other words, the number of the active S boxes at the time of performing the differential analysis (differential attack) increases, and the difficulty of analyzing an encryption key etc. increases, whereby the robustness against the differential analysis becomes higher and highly secure encryption processing can be realized.

According to the structure of the embodiments of the present invention, in the Feistel type common key block encrypting process in which the SPN type F function having the nonlinear conversion section and the linear conversion section is repeatedly executed the plurality of rounds, the linear conversion process of the F function corresponding to each of the plurality of rounds is performed as the linear conversion process which employs the MDS (Maximum Distance Separable) matrix, the r different MDS matrices, corresponding to the encrypting algorithm of the number of rounds 2r, are generated so as to perform the linear conversion process which employs the r different MDS matrices in each of the even number rounds and the odd number rounds, and confirm that the matrix having the column vectors of the MDS matrices to be applied shows linear independence or constitutes an MDS matrix, to thereby ensure that the simultaneous difference cancellation caused by the active S box does not occur and become possible to increase the minimum number (robustness index against the differential attack in the common key block encryption) of the active S box in the entire encrypting function. In other words, the number of the active S boxes at the time of performing the differential analysis (differential attack) increases, so that the difficulty of analyzing the encryption key etc., increases, whereby the robustness against the differential analysis is high so as to realize the highly secure encryption processing.

According to the structure of the embodiments of the present invention, in the Feistel type common key block encrypting process in which the SPN type. F function having the nonlinear conversion section and the linear conversion section is repeatedly executed the plurality of rounds, the linear conversion process of the F function corresponding to each of the plurality of rounds is performed as the linear conversion process which employs the MDS (Maximum Distance Separable) matrix. Corresponding to the encrypting algorithm of the number of rounds 2r, q (integer, $2 \leq q < r$) different MDS matrices are generated, and the linear conversion process is carried out where the q different MDS matrices are repeatedly applied in each of the even number rounds and the odd number rounds, so that application of the MDS matrices less than the number of rounds reduces the possibility of occurrence of the simultaneous difference cancellation caused by the active S box, whereby it becomes possible to increase the minimum number of the active S box in the entire encrypting function which is the robustness index against the differential attack in the common key block encryption. In other words, the number of the active S boxes at the time of performing the differential analysis (differential attack) increases, so that the difficulty of analyzing the encryption key etc. increases, whereby the robustness against the differential analysis is high and the highly secure encryption processing can be realized.

BRIEF DESCRIPTION OF THE DRAWINGS

The above and other objects, features and advantages of the present invention will become more apparent from the following description of the presently preferred exemplary embodiment of the invention taken in conjunction with the accompanying drawing, in which:

FIG. 3 is a diagram showing an example of a square matrix applied to a linear conversion process;

FIG. 4 is a diagram for explaining how three steps of simultaneous difference cancellation in the 128-bit block encryption where m=8 and n=8 are performed;

FIG. 8 is a view showing an example of an MDS matrix;

DETAILED DESCRIPTION OF THE EMBODIMENTS

A cryptographic processing apparatus and a cryptographic processing method, and a computer program in accordance with embodiments of the present invention will be described in detail hereinafter. The description will be made in the order of the following:

1. Differential analysis process in common key block encryption algorithm
2. Encrypting algorithm based on an embodiment of the present invention 1. Difference Analysis Process in Common Key Block Encryption Algorithm First, an outline of a differential analysis process in a common key block encryption algorithm typically represented by DES (Data Encryption Standard) encryption will be described with using a generalized common key block encryption model.

The algorithm of the common key block encryption may be divided mainly into a round function section that performs conversion of input data and a key schedule section that generates a key applied at each round of the round function section. Based on one master key (main key), a key (sub key) to be applied at each round of the round function section is generated by inputting into the key schedule section and applied in each round function section. A typical system of this common key cryptosystem is DES (Data Encryption Standard) that is used as a U.S. federal standard encryption system.

Figure 1:
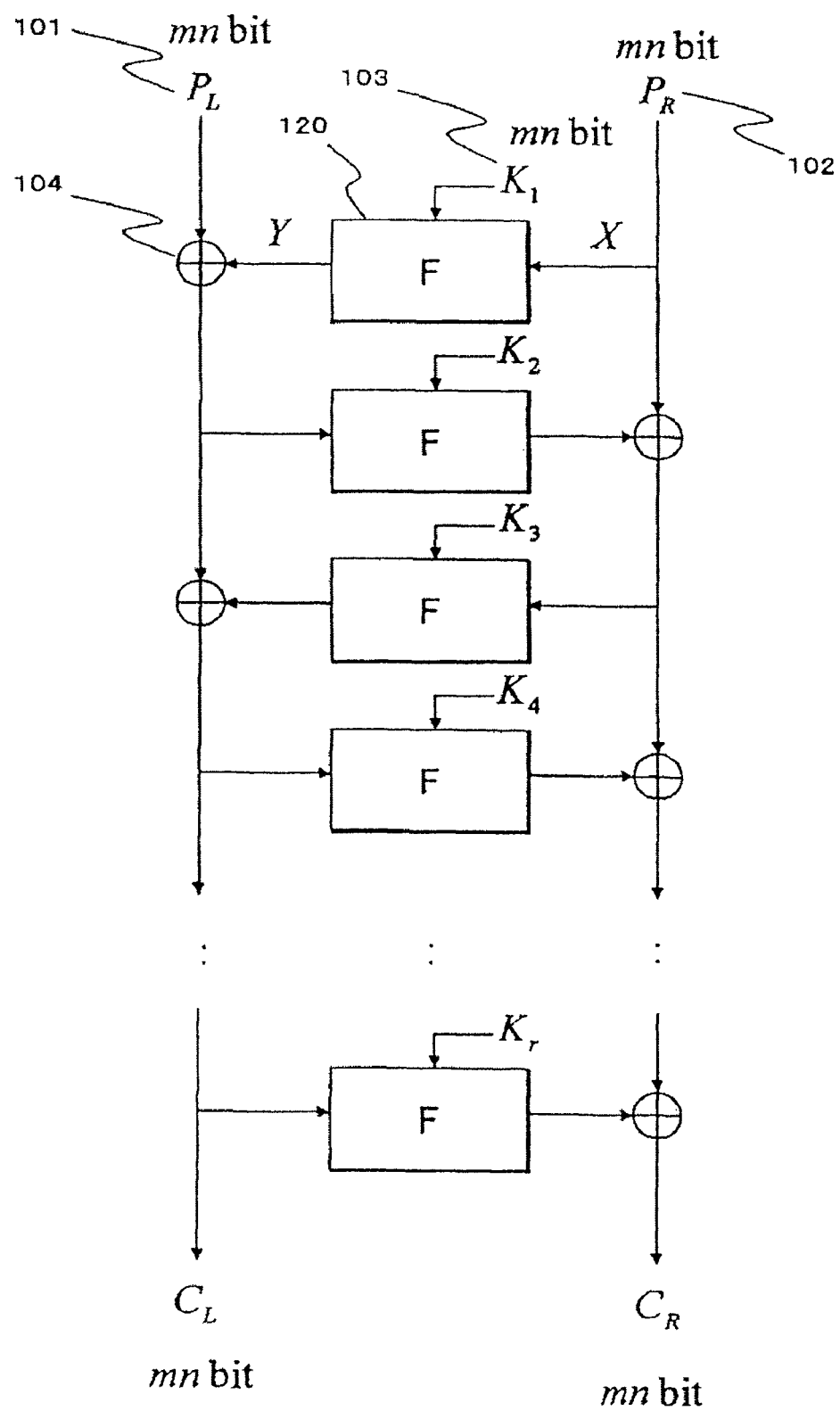
FIG. 1 is a diagram showing a structure of typical common key block encryption with a Feistel structure.

A structure of the typical common key block encryption called a Feistel structure will be described with reference to FIG. 1.

The Feistel structure has a structure to convert a plain text into a cipher text by way of simple repetition of a conversion function. A length of the plain text is assumed to be 2 nm bits where both m and n are integers. At first, the plain text of 2 nm bits is divided into two input data $P_L$ (Plain-Left) 101 and $P_R$ (Plain-Right) 102 of mn bits, and provided as input values.

The Feistel structure is expressed by repetition of a basic structure called a round function. A data conversion function included in each round is called an F function 120. In a structure of FIG. 1, the F function (round function) 120 shows an example of a structure where it is repeated for r steps.

For example, at the first round, an input data X of mn bits and a round key $K_1$ 103 of mn bits inputted from the key generation section (not shown) are inputted into the F function 120, and data Y of mn bits is outputted after processing data conversion in the F function 120. The output and input data (input data $P_L$ in the case of the first step) from the preceding step on the other side are subjected to an exclusive-OR operation in an exclusive-OR section 104, and an operation result of mn bits is outputted to the following round function. This process, that is, an encrypting process where F function is repeatedly applied a predetermined number of rounds (r) is completed so as to output division data $C_L$ (Cipher-Left) and $C_R$ (Cipher-Right) of the cipher text. According to the above structure, a decryption process of the Feistel structure may only be carried out by reversing the order of inserting the round key, so that it is understood that it is not necessary to construct an inverse function.

Figure 2A:
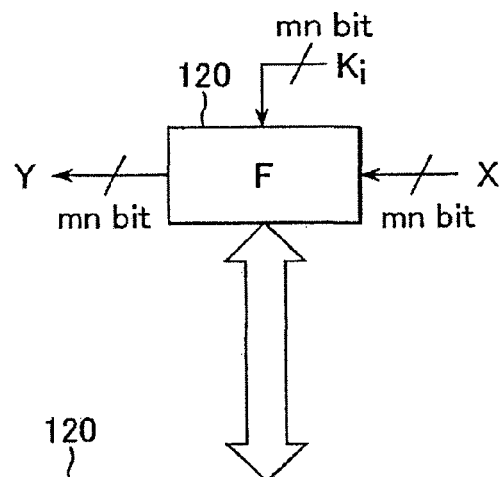
FIG. 2 is a diagram for explaining a structure of an F function set up as a round function section in a linear conversion section.
Figure 2B:
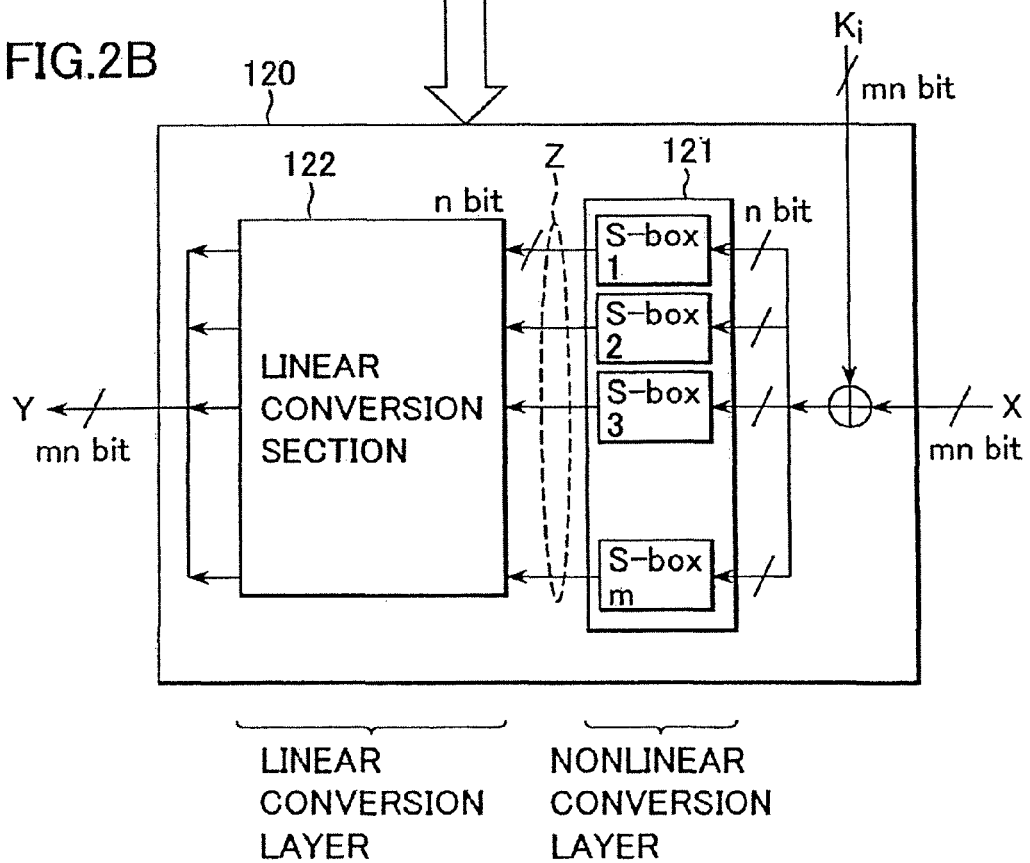

A structure of the F function 120 set up as a function of each round will be described with reference to FIG. 2. FIG. 2(a) is a diagram showing the input and, output to the F function 120 in one round. FIG. 2(b) is a diagram showing a particular structure of the F function 120. As shown in FIG. 2(b) the F function 120 has a so-called SPN type structure where a nonlinear conversion layer and a linear conversion layer are connected together.

As shown in FIG. 2(b) the SPN type F function 120 has a plurality of S boxes (S-box) 121 which perform the nonlinear conversion process. An input value X of mn bits from the preceding step of the round function section and a round key Ki inputted from the key schedule section are subjected to the exclusive-OR operation. The resulting output is inputted into the plurality (m pieces) of S boxes 121 where the nonlinear conversion process is carried out for every n bits. In each of the S boxes the nonlinear conversion process which employs a conversion table, for example, is carried out.

An output value Z, of mn bits, which is the output data from the S boxes 121 is inputted into a linear conversion section 122 for performing the linear conversion process, where the linear conversion process, such as for example a process of exchanging bit positions, is performed so as to output an output value Y of mn bits. This output value Y and the input data from the preceding step are subjected to the exclusive-OR operation, which is rendered to be an input value to the F function of the next round.

The F function 120 as shown in FIG. 2 has an input/output bit length of m×n bits (where m, n are integers). The nonlinear conversion layer has m pieces of S boxes 121 arranged in parallel as the nonlinear conversion layer, each having an n-bits input/output. The linear conversion section 122 as the linear conversion layer performs the linear conversion process based on an m-th square matrix which has, as components, elements in an extension field GF ($2^n$) of 2 defined by an n-th irreducible polynomial.

An example of the square matrix applied to the linear conversion process in the linear conversion section 122 is shown in FIG. 3. A square matrix 125 as shown in FIG. 3 is an example where n=8 and m=8. A linear conversion is performed by way of an operation which employs the predetermined square matrix 125 with respect to m n-bit data Z[1], Z[2], . . . , Z[m] outputted from the nonlinear conversion section (S boxes 121), and Y[1], Y[2], . . . , Y[m] are determined as the F function (round function) output. At this time, however, a linear operation with respect to the components of a matrix of each data is performed in the predetermined extension field GF ($2^n$) of 2.

In a conventional Feistel type encryption, since the same linear conversion layer as the F function is used for all steps, there is a drawback such that a plurality of differences will cancel one another simultaneously when the differences propagate. As described in the column of the background art, as a typical method of the decryption methods, the differential analysis (or the differential decryption method) is known which analyzes the application key in each round function by analyzing the majority of the input data (plain text) and their output data (cipher text), which have certain differences. In the common key block encryption, such as the conventional DES encryption algorithm, the process (conversion matrix) applied in the linear conversion section 122 of the F function 120 section is set as equal in the round of each step, which makes it easy to perform the differential analysis, whereby making the key analysis easier.

An example in which a plurality of differences cancel one another simultaneously as the differences propagate will be described with reference to FIG. 4. In addition, in this specification, the Δ (delta) symbol will be used when expressing a difference.

FIG. 4 is a diagram for explaining how three steps of simultaneous difference cancellations in 128-bit block encryption where m=8 and n=8 are executed. It is assumed that, in the diagram, a 64-bit data is divided per byte so as to be expressed as a vector, and that each element is written in hexadecimal notation.

Such simultaneous difference cancellations in the F function having a three-step structure take place, for example, based on a setting mechanism of the following data statuses 1-4. The data status generated by a mechanism as described below is a data status which can be generated by setting up a plurality of differential input data. It may take place when analyzing a key (round key) in a so-called differential analysis.

(Status 1)

It is assumed that a left half of an input difference to i round is an input difference ($\Delta Xi-1=(00, 00, 00, 00, 00, 00, 00, 00)$) which is all zeros, and that an input difference of a right half is an input difference ($\Delta Xi=(34, 00, 00, 00, 00, 00, 00, 00)$) which is all zeros except for an input to only one S-box. This data status means that setting up a plurality of differential input data allows such a data status to be acquired at i round.

In addition, the respective eight elements in $\Delta Xi=(34, 00, 00, 00, 00, 00, 00, 00)$ correspond to the input differences with respect to m S boxes (m=8) arranged in the F function. The difference (34) is inputted into the first S box ((S1) in FIG. 4), and (00) is the input difference with respect to the second through eighth S boxes.

In addition, an output difference of an S box having an input difference of zero (00) is zero (00). As far as differential data are concerned, the S box having the input difference of zero (00) does not perform any operation, so that it is not active and called as a non-active S box. On the other hand, an S box having a non-zero input difference (difference: 34 as in the example of FIG. 4) generates as an output difference by causing a nonlinear conversion corresponding to the input difference of non-zero. Accordingly, it is called an active S box (Active S-box).

In the example of FIG. 4 the output difference (b7) is generated from an active S box (S1) which inputs the input difference (34) of non-zero, other non-active S boxes S2-S8 generate an output difference (00) based on an input difference (00) of zero, which is considered to be the differential input of the linear conversion section.

(Status 2)

After an output difference from an S box (hereinafter referred to as Active S-box) having the input difference (difference: 34 as in the case of FIG. 4) of the non-zero to i round is diffused in the linear conversion layer, it is outputted from the F function (output value=$\Delta Yi$), and becomes an input difference $\Delta Xi+1$ to the next round.

Figure 5:
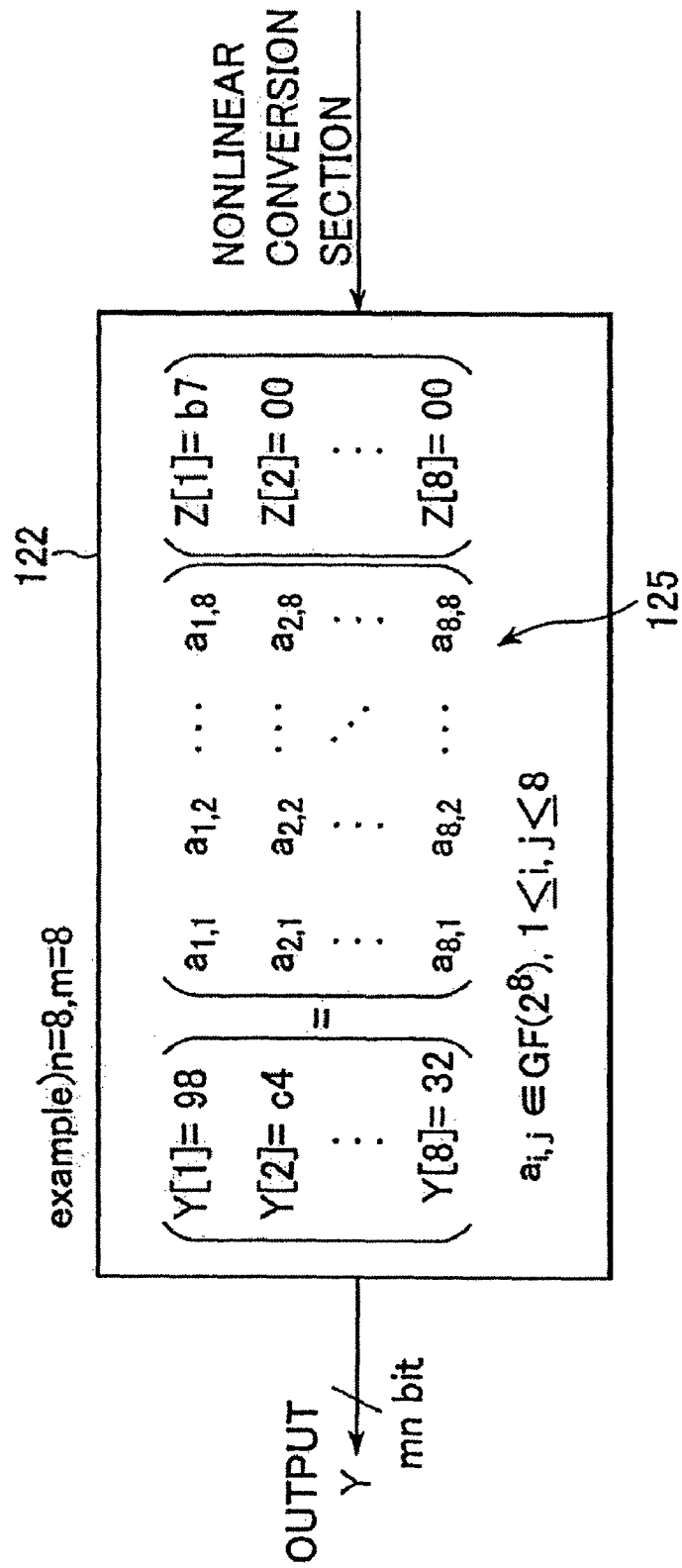
FIG. 5 is a diagram for explaining an example where linear conversion by means of a square matrix is performed in the linear conversion section of F function so as to generate an F function output difference ΔYi.

As for the linear conversion in the example of FIG. 4, the linear conversion by means of the certain specific square matrix 125 which is common in the F function of each round and which is shown, for example in FIG. 5 is performed, and $\Delta Yi=(98, c4, b4, d3, ac, 72, 0f, 32)$ at i round is outputted as the F function output difference. As can be seen from the linear conversion structure as shown in FIG. 5, the output difference $\Delta Yi=(98, c4, b4, d3, ac, 72, 0f, 32)$ is determined as a value depending only on an output factor $Z[1]=b7$ which is from the one active S box (S1).

$\Delta Yi=(98, c4, b4, d3, ac, 72, 0f, 32)$, which serves as the F function output difference at this i round, and the input difference ($\Delta Xi-1=(00, 00, 00, 00, 00, 00, 00, 00)$) that is all zeros are subjected to the exclusive-OR (XOR) operation in the exclusive-OR section 131 as shown in FIG. 4. The operation result becomes an input difference $\Delta Xi+1$ to the next round (i+1).

The exclusive-OR (XOR) operation between $\Delta Yi=(98, c4, b4, d3, ac, 72, 0f, 32)$ as the F function output difference at i round and the input difference $\Delta Xi-1=(00, 00, 00, 00, 00, 00, 00, 00)$ which is all zeros results in $\Delta Yi$. Accordingly, the $\Delta Yi$ becomes the input difference $\Delta Xi+1=\Delta Yi=(98, c4, b4, d3, ac, 72, 0f, 32)$ to the next round (i+1).

(Status 3)

An output difference $\Delta Yi+1$ from the F function at i+1 round has a non-zero value only in the position of the active S-box at i round. This data status means that setting up a plurality of differential input data allows such a data status to be acquired.

In other words, it is $\Delta Yi+1=(ad, 00, 00, 00, 00, 00, 00, 00)$. As with i round, it has a non-zero value only in the position (the first S box (S1)) of S-box having a non-zero differential value (difference: 34 in the case of FIG. 4). It is clearly ad≠00.

(Status 4)

This data status is achieved when the output difference of the active S box (Active S-box) (S1) at i+2 round is in agreement with the output difference of the active S box (Active S-box) (S1) at i round, or as shown in FIG. 4, the output difference of the active S box (S1) at i+2 round becomes b7, and therefore is in agreement with the output difference (b7) of the active S box (S1) at i round. This data status means that setting up a plurality of differential input data allows such a data status to be acquired.

If such a data status occurs, an output difference $\Delta Yi+2=(98, c4, b4, d3, ac, 72, 0f, 32)$ of the F function at i+2 round will be in agreement with output difference $\Delta Yi=(98, c4, b4, d3, ac, 72, 0f, 32)$ of the F function at i round, or two rounds before i+2 round.

As a result, in the exclusive-OR section 133, $\Delta Xi+1=(98, c4, b4, d3, ac, 72, 0f, 32)$ and $\Delta Yi+2=(98, c4, b4, d3, ac, 72, 0f, 32)$ of the same values are subjected to the exclusive-OR operation, and a value having only zeros is outputted as an exclusive-OR operation result.

As a result, it becomes a left input difference $\Delta Xi+3=(00, 00, 00, 00, 00, 00, 00, 00)$ from the preceding step (i+2 round) of the output difference to the next step (round i+3).

The left input $\Delta Xi+3=(00, 00, 00, 00, 00, 00, 00, 00)$ to this round i+3 has only zeros, similar to the left input $\Delta Xi-1=(00, 00, 00, 00, 00, 00, 00, 00)$ to round i. A process similar to those at rounds i through i+2 may be repeated at a round after the round i+3.

As a result, a drawback arises such that the number of active S boxes does not increase even the number of rounds increase, and the robustness against the differential attack does not increase considerably.

In the common key block encryption, as a robustness index against the differential attack, the minimum number of the active S boxes in the entire encrypting function is known. It is considered that the greater the minimum number of the number of active S boxes is, the higher the robustness against the differential attack is.

As described above, the differential analysis (differential attack) is a method in which a majority of input data (plain texts) and their output data (cipher texts) having certain differences are set up, whose relationships are analyzed in order to analyze an application key in each round function. In this differential analysis, if the number of active S boxes can be decreased, the analysis may become easier and the number of analysis processes can be reduced.

In the above-mentioned example with reference to FIG. 4, it is shown that the way in which a pattern where only the first S box (S1) is an active S box is generated. However, as for other S boxes (S2-S8), it is possible to set up any one of the S boxes as the active S box by setting up the input data of the differential analysis. By performing such a differential analysis process, it becomes possible to analyze the nonlinear conversion process of each of the S boxes and further to analyze the round key inputted to the F function.

In order to increase the robustness against such a differential analysis, it is necessary to maintain the number of active S boxes to be large, that is, the minimum number of the active S boxes is required to be large.

In the example as described with reference to FIG. 4, in view of the F function which performs input from the right into the left, in other words, considering only the i-th round and the i+2-th round as rounds for active S box calculation processing, the number of active S boxes is only two. Although the F function which performs input from the left into the right, that is, the number of active S boxes is eight at the i+1-th round, the number of active S boxes at the i+3-th round is set to zero by simultaneous difference cancellations, and the analysis process of the nonlinear conversion process of each of the S boxes by way of differential analysis becomes easy.

As for the common key block encryption algorithm as shown in FIG. 4, the linear conversion matrix applied in the linear conversion section in each round is the same. This structure allows a possibility that only two active S boxes especially in the F function which performs the input from the right into the left may generate the simultaneous difference cancellations. Therefore, there is a drawback that the minimum number of the active S boxes does not sufficiently increase even the number of rounds increase, and the robustness against the differential attack does not increase considerably.

Next, similarly, in the structure in which the same linear conversion matrix is used for the F function of every step (round), a simultaneous difference cancellations generating mechanism over five rounds will be described with reference to FIG. 6.

Figure 6:
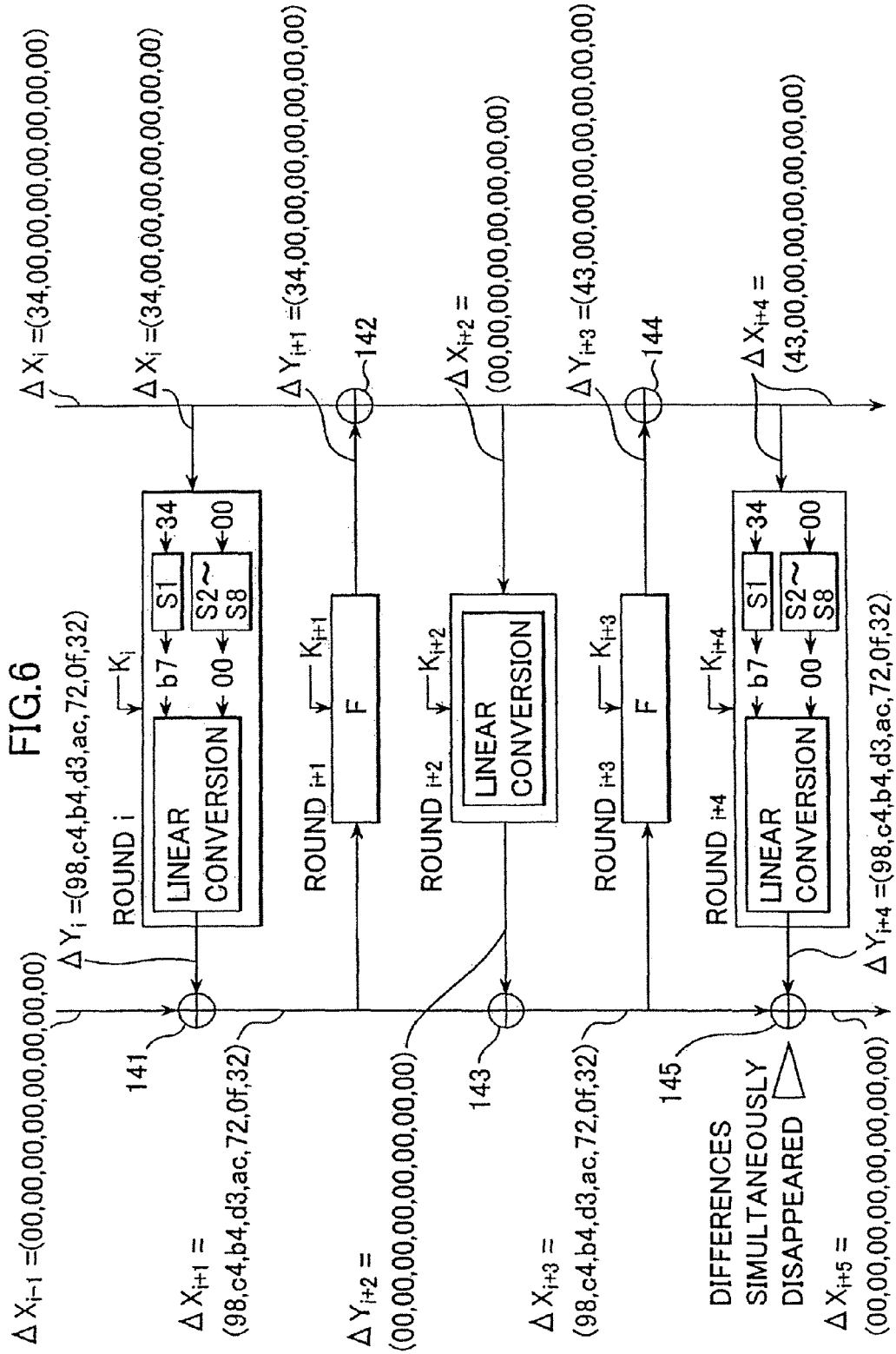
FIG. 6 is a diagram for explaining how five steps of simultaneous difference cancellation in the 128-bit block encryption where m=8 and n=8 are performed.

FIG. 6 is a diagram for explaining how five steps of the simultaneous difference cancellations in the 128-bit block encryption where m=8 and n=8 are performed. It is assumed that, in the figure, the 64-bit data is divided per byte so as to be expressed as a vector, and that each element is written in hexadecimal notation.

Such simultaneous difference cancellations in the F function having a five-step structure take place, for example, based on a setting mechanism of the following data statuses 1-7. The data status generated by a mechanism as described below is a data status which can be generated by setting up a plurality of differential input data. It may take place when analyzing a key (round key) in the so-called differential analysis.

(Status 1)

It is assumed that a left half of an input difference to i round is an input difference ($\Delta Xi$=(00, 00, 00, 00, 00, 00, 00, 00)) which is all zeros, and that an input difference of a right half is an input difference ($\Delta Xi$=(34, 00, 00, 00, 00, 00, 00, 00)) which is all zeros except for an input to only one S-box. This data status means that setting up a plurality of differential input data allows such a data status to be acquired at i round.

In addition, the respective eight elements in $\Delta Xi$=(34, 00, 00, 00, 00, 00, 00, 00) correspond to the input differences with regard to m respective S boxes (m=8) arranged in the F function. (34) is inputted into the first S box ((S1) in FIG. 6); and (00) is the input difference with respect to the second through eighth S boxes.

In addition, as described above, the output difference of the S box having the input difference of zero (00) is zero (00). As far as difference data are concerned, the S box having the input difference of zero (00) does not perform any operation, so that it is not active and called as the non-active S box. On the other hand, the S box (S1) having the non-zero input difference (difference: 34 as in the example of FIG. 6) causes the nonlinear conversion effect corresponding to the input difference of non-zero as the output difference, which is the active S box (Active S-box).

In the example of FIG. 6 the output difference (b7) of one active S box (S1) which inputs the input difference (34) of non-zero is generated, other non-active S boxes S2-S8 generate the output difference (00) based on the input difference (00) of zero, which is considered to be the differential input of the linear conversion section.

(Status 2)

After an output difference from an S box (hereinafter referred to as Active S-box) having the input difference (difference: 34 as in the case of FIG. 4) of the non-zero to i round is diffused in the linear conversion layer, it is outputted from the F function (output value=$\Delta Yi$) and becomes an input difference $\Delta Xi+1$ to the next round.

In the example of FIG. 6 the linear conversion by a certain specific square matrix 125 common in each round as shown, for example, in FIG. 5 is carried out, and $\Delta Yi$=(98, c4, b4, d3, ac, 72, 0f, 32) is outputted as the F function output difference at i round.

The $\Delta Yi$=(98, c4, b4, d3, ac, 72, 0f, 32) that serves as the F function output difference at i round and the input difference ($\Delta Xi-1$=(00, 00, 00, 00, 00, 00, 00, 00)) which is all zeros are subjected to the exclusive-OR (XOR) operation in an exclusive-OR section 141 as shown in FIG. 6. The operation result becomes the input difference $\Delta Xi+1$ to the next round (i+1).

The exclusive-OR (XOR) operation between $\Delta Yi$=(98, c4, b4, d3, ac, 72, 0f, 32) that serves as the F function output difference at i round and the input difference $\Delta Xi-1$=(00, 00, 00, 00, 00, 00, 00, 00) which is all zeros results in $\Delta Yi$. Accordingly, the $\Delta Yi$ becomes the input difference $\Delta Xi+1$=$\Delta Yi$=(98, c4, b4, d3, ac, 72, 0f, 32) to the next round (i+1).

(Status 3)

An output difference $\Delta Yi+1$ from the F function at i+1 round has a non-zero value only in the position of the active S-box at i round. This data status means that setting up a plurality of differential input data allows such a data status to be acquired.

In other words, $\Delta Yi+1$=(34, 00, 00, 00, 00, 00, 00, 00). As with i round, it has a non-zero value only in the position (the first S box (S1)) of S-box having a non-zero difference value (difference: 34 in the case of FIG. 6).

(Status 4)

The input to the F function at i+2 round is the resulting exclusive-OR operation between $\Delta Xi$=(34, 00, 00, 00, 00, 00, 00, 00) and ΔYi+1=(34, 00, 00, 00, 00, 00, 00, 00) in the exclusive-OR section 142. In other words, it is the resulting exclusive-OR operation between the same data, and it is ΔXi+2=(00, 00, 00, 00, 00, 00, 00, 00) which is an all-zero input. As a result, the output difference from the F function at i+2 round becomes also an output difference, ΔYi+2=(00, 00, 00, 00, 00, 00, 00, 00) which is all zeros.
(Status 5)

The input to the F function at i+3 round is the resulting exclusive-OR operation between ΔXi+1=(98, c4, b4, d3, ac, 72, 0f, 32) and the F function output difference at i+2 round ΔYi+2=(00, 00, 00, 00, 00, 00, 00, 00) which is all zeros in the exclusive-OR section 143, which becomes the input ΔXi+3=ΔXi+1=(98, c4, b4, d3, ac, 72, 0f, 32) to the F function of i+3 round.
(Status 6)

The F function output difference at i+3 round becomes ΔYi+3=(43, 00, 00, 00, 00, 00, 00, 00), which is subjected to the exclusive-OR operation with ΔXi+2=(00, 00, 00, 00, 00, 00, 00, 00) which is all zeros in the exclusive-OR section 144. The resulting ΔXi+4=ΔYi+3=(43, 00, 00, 00, 00, 00, 00, 00) becomes the F function input difference at i+4 round.
(Status 7)

When the output difference of the active S box (Active S-box) (S1) at i+4 round is in agreement with the output difference of the active S box (Active S-box) (S1) at i round, or as shown in FIG. 6, the output difference of the active S box (S1) at i+4 round becomes b7, so that it is in agreement with the output difference (b7) of the active S box (S1) at i round. This data status means that setting up a plurality of differential input data allows such a data status to be acquired.

If this data status occurs, an output difference ΔYi+4=(98, c4, b4, d3, ac, 72, 0f, 32) of the F function at i+4 round will be in agreement with the output difference ΔXi+3=(98, c4, b4, d3, ac, 72, 0f, 32) of the exclusive-OR section 143 at i+2 round, or two rounds before i+4 round.

As a result, in the exclusive-OR section 145 an exclusive-OR operation for the same values is performed, which are ΔXi+3=(98, c4, b4, d3, ac, 72, 0f, 32) and ΔYi+4=(98, c4, b4, d3, ac, 72, 0f, 32), and a value having only zeros is outputted as an exclusive-OR operation result.

As a result, the input difference to the next step (round i+5) is set up as ΔXi+5=(00, 00, 00, 00, 00, 00, 00, 00).

The left input to this round i+5, ΔXi+5=(00, 00, 00, 00, 00, 00, 00, 00) is all zeros similarly as in the left input to round i, ΔXi−1=(00, 00, 00, 00, 00, 00, 00, 00). There is a possibility that, at rounds after round i+5, a process similar to that at rounds i through i+4 may be repeated.

As a result, a drawback arises such that the number of active S boxes does not increase as the number of rounds increase, and the robustness against the differential attack does not increase considerably.

As described above, the differential analysis (differential attack) is the method in which a majority of input data (plain texts) and their output data (cipher texts) having certain differences are set up, whose relationships are analyzed in order to analyze an application key in each round function. In this differential analysis, if the number of active S boxes can be decreased, the analysis may become easy and the number of analysis processes can be reduced.

In the example as described with reference to FIG. 6, in view of the F function which performs input from the right into the left, in other words, considering only the i-th round, the i+2-th round, and the i+4-th round as rounds for active S box calculation processing, the number of active S boxes is only two in total where the i-th round=1, the i+2-th round=0, the i+4-th round=1. Although the F function which performs input from the left into the right, that is, the number of active S boxes is eight at the i+1-th round and the i+3-rd round, the number of active S boxes at the i+5-th round is set to zero by simultaneous difference cancellations. Accordingly, the analysis process of the nonlinear conversion process of each of the S boxes by way of differential analysis and the analysis process of an input round key with respect to the F function become relatively easy.

In the example with reference to FIG. 6, it is shown the way in which a pattern where only the first S box (S1) is an active S box is generated. However, as for other S boxes (S2-S8) it is possible to set up any one of the S boxes as the active S box by setting up the input data of the differential analysis. By performing such a differential analysis process, it becomes possible to analyze the nonlinear conversion process of each of the S boxes and further to analyze the round key inputted to the F function.

Figure 7:
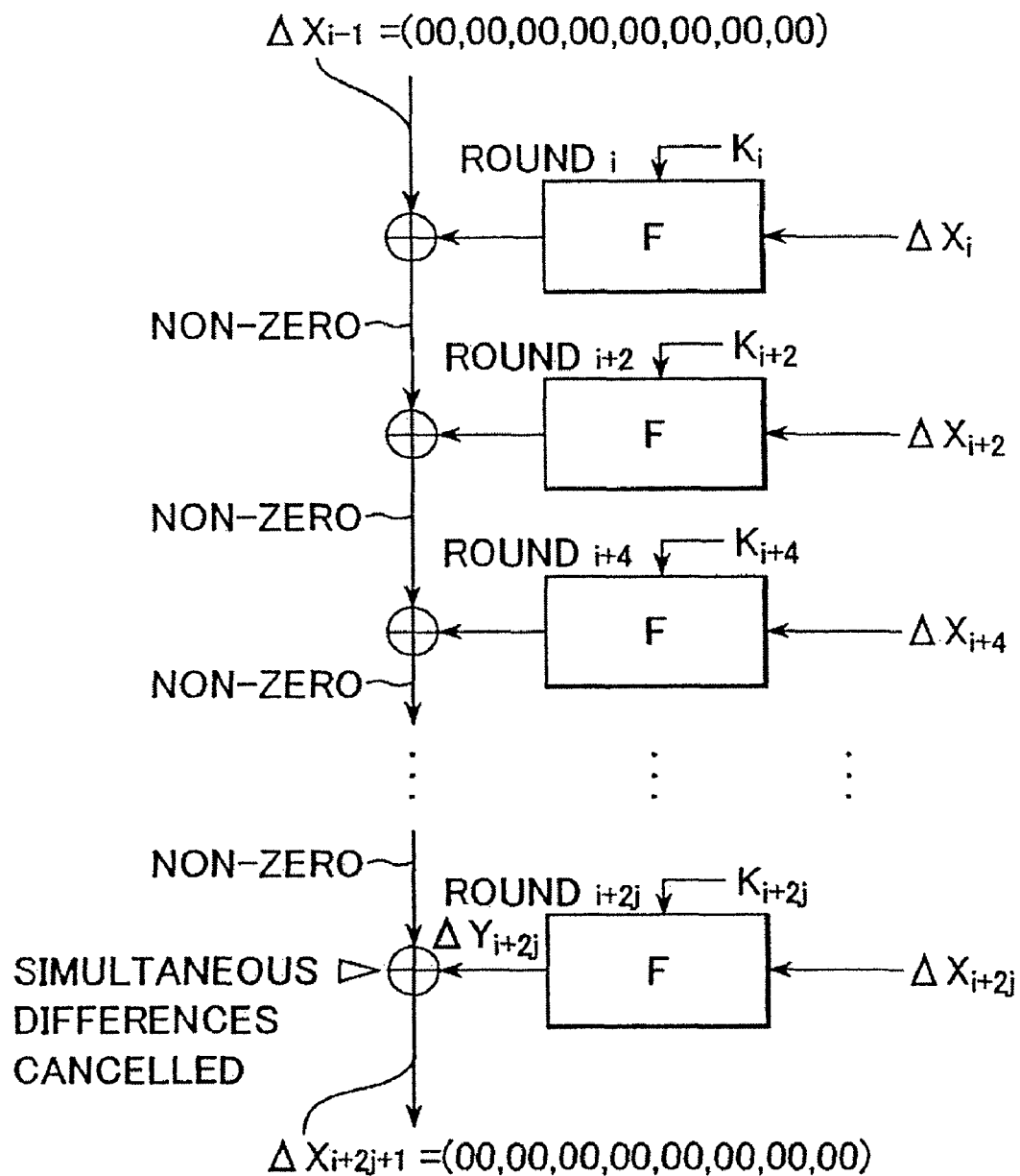
FIG. 7 is a diagram for explaining the definition of the simultaneous difference cancellation at an arbitrary step in the common key block encryption.

The examples of the simultaneous difference cancellations are described in the cases of three and five rounds with reference to FIG. 4 and FIG. 6. If the simultaneous difference cancellation is defined by generalizing it to an arbitrary number of rounds, the definition will be as follows. With reference to FIG. 7, the definition of the simultaneous difference cancellation at the arbitrary number of rounds will be described. In addition, FIG. 7 shows the rounds (i, i+2, i+4, i+2j) in every other one of Feistel structure which performs the common key block encryption of the Feistel structure.
Definition By "simultaneous difference cancellation", we mean that in a process where half ($P_L$ or $P_R$) the input difference at the round i of the Feistel structure is zero (ΔXi=(00, 00, 00, 00, 00, 00, 00, 00) in FIG. 7) with which the output difference of the F function at i+2j round (j=0, 1, 2, . . . ) is operated in the exclusive-OR section, the exclusive-OR operation result becomes 0 (ΔXi+2j+1=(00, 00, 00, 00, 00, 00, 00, 00) in FIG. 7) at a certain round i+2k.

At that time, it is assumed that the active S box (Active S-box) which exists in the F function at i, i+2, i+4, i+2k round is called "active S box having generated simultaneous difference cancellation". If the number of non-zero elements of vector A is defined as Hamming weight hw(A), the number a of an active S boxes which generate the simultaneous difference cancellation can be expressed as the following equation:

$$a = \sum_{j=0}^{k} hw(\Delta X_{i+2j})$$

In both examples of the above-mentioned round three and round five, the number of active S boxes which have generated simultaneous difference cancellation is two, or a=2.

As described above, a robustness index against the differential attack in the common key block encryption is the minimum number of the active S box in the entire encrypting function. It is considered that the greater the minimum number of the number of active S boxes is, the higher the robustness against the differential attack is.

However, in the structure where the same linear conversion matrix is used for the F function of all steps as in the DES algorithm, there is a possibility that only two active S boxes may generate the simultaneous difference cancellation as described above with reference to FIG. 4, FIG. 6. Because of such nature, the minimum number of the active S box does not sufficiently increase as the number of rounds increase.

Accordingly, there is a drawback that the robustness against the differential attack does not increase considerably.

2. Encrypting Algorithm Based on an Embodiment of the Present Invention

Now, a common key block encrypting algorithm in accordance with an embodiment of the present invention will be described. The algorithm realizes a structure in which the simultaneous difference cancellation based on several active S boxes does not or is not likely to take place, thereby improving the robustness against the differential attack, or increasing the difficulty of key analysis and its security.

A feature of the encrypting algorithm in accordance with the present embodiment is that, unlike the conventional DES algorithm, it does not employ a structure where a common process (conversion matrix) is applied to the linear conversion section arranged for the F function at each round. The algorithm according to the present embodiment employs the structure in which a plurality of different MDS (Maximum Distance Separable) matrices are set up. In particular, it has a structure in which the linear conversion process is carried out while employing different MDS matrices at least at each of the consecutive odd number rounds and the consecutive even number rounds.

The encrypting algorithm in accordance with the present embodiment utilizes a property of the MDS (Maximum Distance Separable) matrix and realizes a structure where the simultaneous difference cancellation based on several active S boxes does not or is not likely take place. It increases the minimum number of the active S box and provides the common key block encrypting which is more robust against the differential attack.

The encrypting algorithm of the present embodiment employs the structure of a typical common key block encryption called the Feistel structure having a SPN type F function as described with reference to FIG. 1, FIG. 2. In other words, the encrypting algorithm employs a structure where the SPN type F function having a nonlinear conversion section and a linear conversion section is simply repeated over a plurality of rounds, and a plain text is converted to a cipher text, or alternatively a cipher text is converted to a plain text.

For example, it is assumed that the length of a plain text is 2 mn bits (where both m and n are integers). The plain text of 2 inn bits is divided into two data $P_L$ (Plain-Left) and $P_R$ (Plain-Right) each having mn bits, and is provided as input values for the F function to be performed at each round. As described above with reference to FIG. 2, the F function is an F function having the nonlinear conversion section having the S boxes and the SPN type to which the linear conversion section is connected.

In the structure of the present embodiment, as for the matrix for the linear conversion process applied in the linear conversion section in the F function, a matrix chosen from a plurality of different MDS (Maximum Distance Separable) matrices is set up as a matrix which is applied in the linear conversion section of the F function at each round. In particular, a different MDS matrix is applied at least at each of the consecutive odd number rounds and the consecutive even number rounds.

The MDS matrix will be described. By MDS matrix, we mean a matrix which satisfies the following conditions of (a) and (b):

(a) It is a square matrix.
(b) No determinant of any submatrix included in the matrix is zero. In other words, det(submatrix)≠0

A matrix which satisfies the above conditions (a) and (b) is called an MDS matrix. An example of an MDS matrix is shown in FIG. 8, in which an input/output bit length with respect to the F function performed at each round of the common key block encryption is m×n bits (m, n: integers), the nonlinear conversion section included in the F function is constituted by m S boxes each having the n bits input/output, when the linear conversion section performs the linear conversion process based on an m-th square matrix which has, as components, elements in an extension field GF ($2^n$) of 2 defined by an n-th irreducible polynomial. The example of the MDS matrix as shown in FIG. 8 is an example of the MDS matrix where n=8 and m=8.

When it is assumed that the number of non-zero elements of the vector A is the Hamming weight hw(A), M is the m-th MDS matrix, and x is an input vector to the MDS matrix M, the MDS matrix which satisfies the above (a) and (b) satisfies the following inequality (equation 1):

$$hw(x)+hw(Mx) \geq m+1 \qquad \text{(Equation 1)}$$

The above-mentioned Equation 1 means that the sum of the number of the non-zero elements hw(x) of the input data x to be subjected to the linear conversion by means of the MDS matrix (M) and the number of the non-zero elements hw(Mx) of the output data Mx subjected to the linear conversion by means of the MDS matrix (M) is greater than the order m of the MDS matrix.

By the way, the name of MDS matrix is decided from the fact that the right half of a canonical form of the generated matrix of MDS-code (Maximum Distance Separable Code) satisfies the above-mentioned conditions.

Even in a conventional structure of including a matrix in every F function, it is known that the minimum number of the active S boxes can be held at a relatively high level by using the MDS matrix for the linear conversion matrix, than in the case where the matrix which is not an MDS matrix is used.

The present invention utilizes a matrix that satisfies the conditions of the MDS matrix for the F function at each round, and further provides a method of setting up a different matrix for every round. In particular, different MDS matrices are applied at least at each of the consecutive odd number rounds and the consecutive even number rounds.

As for the Feistel type common key block encryption where the number of steps (the number of rounds) is 2r (where r is an integer), a plurality of examples of structures where the robustness against the differential attack is increased will be described hereinafter.

In addition, in the following description, it is assumed that MLTj represents the linear conversion matrix applied in the linear conversion section the j-th step of F function of the Feistel type common key block encrypting process structure having the number of steps (the number of rounds) of 2r.

Setup Example 1

Linear Conversion Matrix MLTj

In the Setup Example 1 of a linear conversion matrix MLTj, corresponding to the Feistel type common key block encrypting process structure having the number of steps (the number of rounds) of 2r, r MDS matrices are generated in such a way that all the square matrices applied in the r linear conversion sections of the F function at even number rounds are set up as different MDS matrices, and also all the square matrices applied in the r linear conversion sections of the F function at odd number rounds are set up as different MDS matrices.

Figure 9:
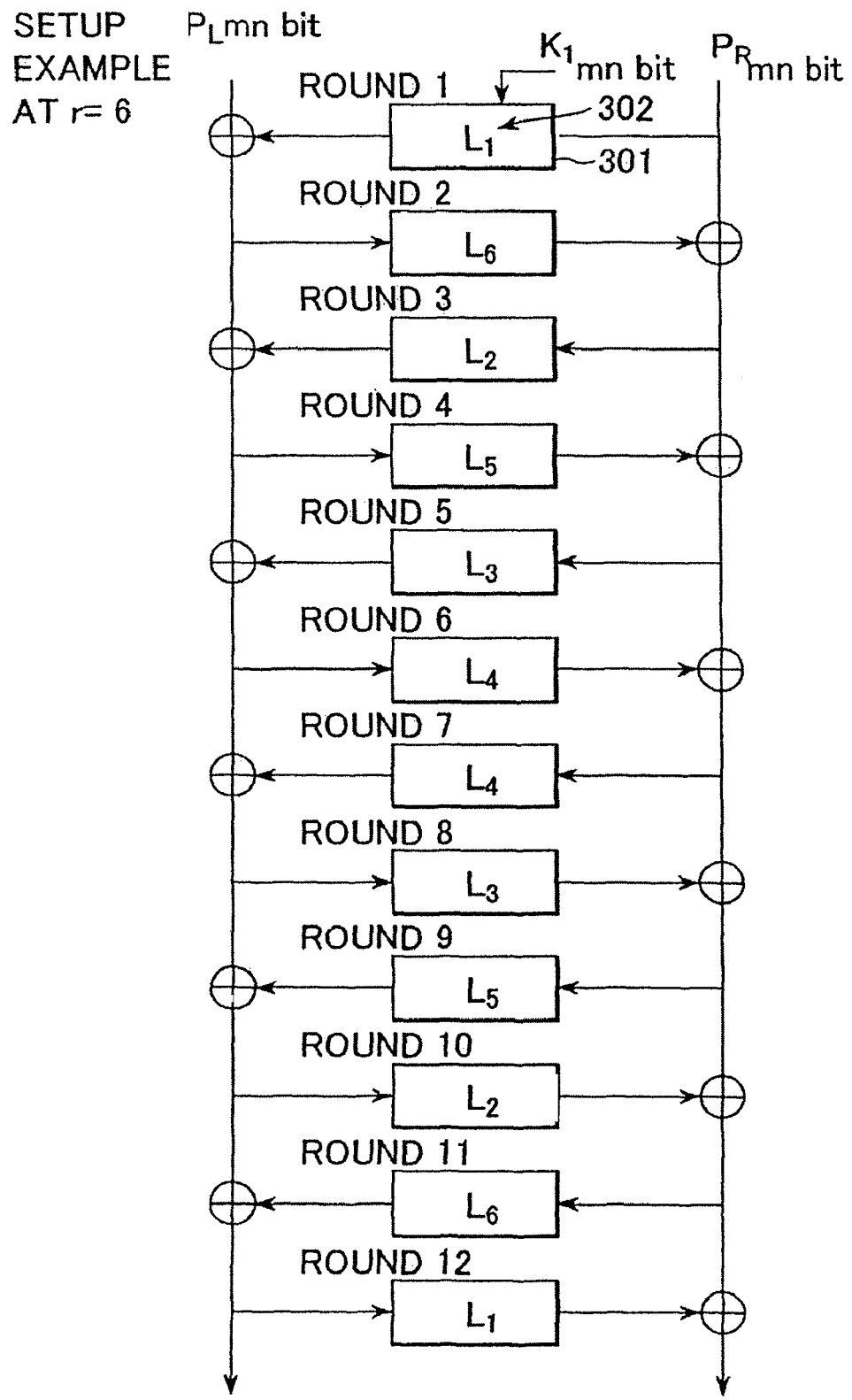
FIG. 9 is a diagram for explaining a setup example of an MDS matrix as a linear conversion matrix of F function at each round in the common key block encrypting algorithm in accordance with the present invention.

An example of a structure which employs this setup example is shown in FIG. 9. FIG. 9 shows the MDS matrices (L1, L2 ... L6) set in the linear conversion section of the F function section at each round, when the Feistel type common key block encrypting process is arranged such that the number of steps (the number of rounds) is expressed as 2r=12, or r=6. Although not shown clearly in the figure, it is assumed that a sub key Ki inputted from the key scheduling section is inputted at each round.

The structure of FIG. 9 is a structure where a plain text of 2 nm bits is divided into two data $P_L$ (Plain-Left) and $P_R$ (Plain-Right) of mn bits, and provided as input values for the F function to be performed at each round. As described above with reference to FIG. 2, any of the F function 301 at first round and the F functions at other rounds is an F function having the nonlinear conversion section constituted by the S boxes and the SPN type to which the linear conversion section is connected.

In FIG. 9, reference symbol Ln as shown in each F function denotes the MDS matrix 302. In other words, L1, L2, ..., L6 respectively indicate six different types of MDS matrices, or indicate the MDS matrices applied to the linear conversion processes in the linear conversion sections of the respective F functions.

Figure 10:
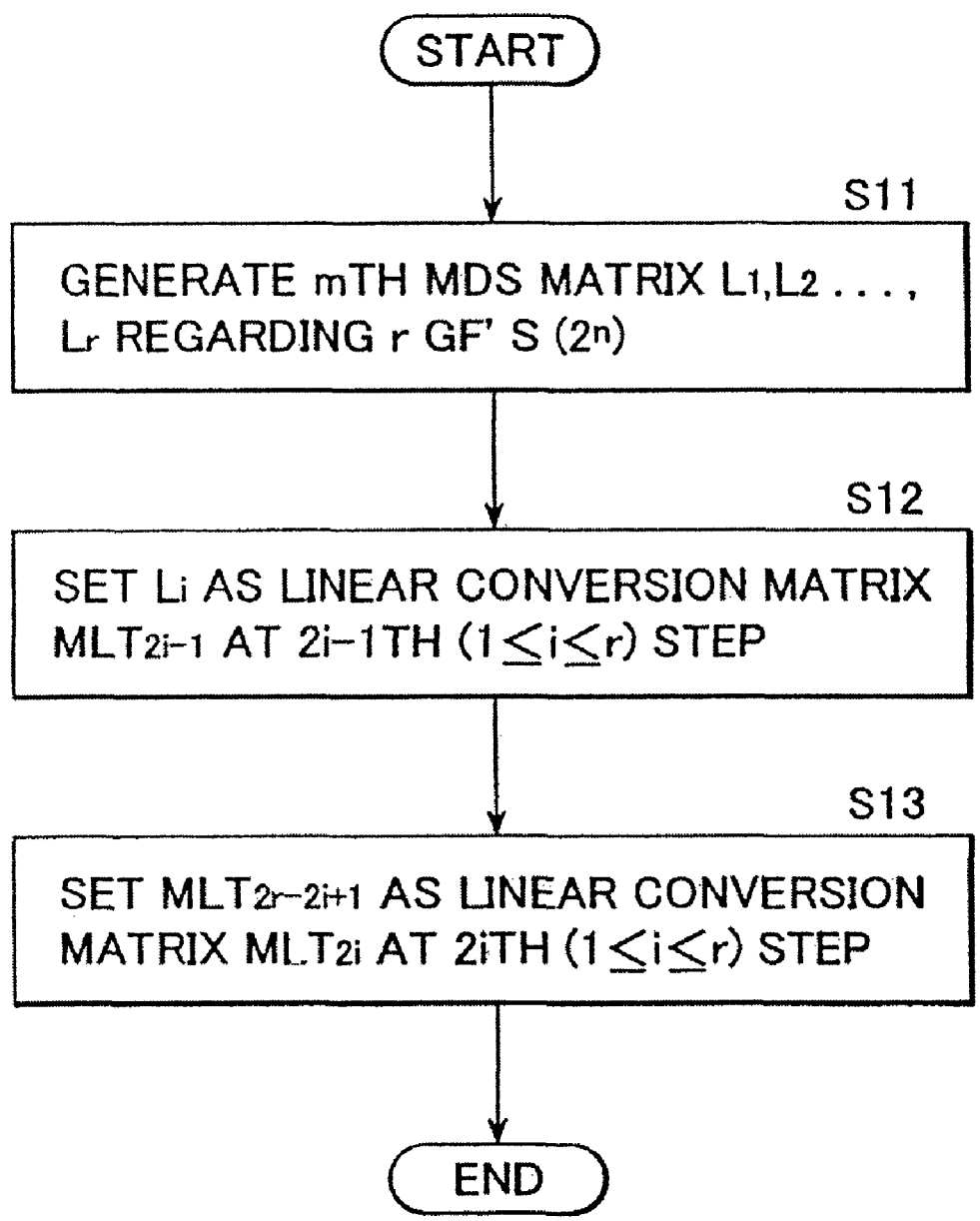
FIG. 10 is a flow chart for explaining the MDS matrix setup processing sequence as a linear conversion matrix of F function at each round in the common key block encrypting algorithm in accordance with an embodiment of the present invention.

A processing sequence of the Setup Example 1 of the linear conversion matrix MLTj will be described with reference to FIG. 10.

[Step S11]

The m-th MDS matrices L1, L2, ..., Lr on r GF's $(2^n)$ are generated.

A processing sequence of generating the m-th MDS matrices L1, L2, ..., Lr on r GF's $(2^n)$ (MDS matrix generation method 1) will be described with reference to FIG. 11.

MDS Matrix Generation Method 1

[Step S101]

Input: Assuming that the required number of MDS's: x, the expansion order: n, and size of a matrix: m, x pieces of m-th MDS matrices L1, L2, ..., Lx are generated on GF $(2^n)$ at random.

[Step S102]

When m arbitrary columns are taken out from xm columns contained in x pieces of m-th MDS matrices L1, L2, ..., Lx, they are checked to see whether they are linearly independent. If they pass the check, the process goes to Step S103, or otherwise returns to Step S101.

[Step S103]

The x pieces of m-th MDS matrices L1, L2, ..., Lx are outputted as the MDS matrices applied to the Feistel type common key block encryption having the number of rounds of 2x.

By way of above processes, the x pieces of m-th MDS matrices L1, L2, ..., Lx are generated. In this example, x=r.

Returning to FIG. 10, the description of the processing sequence of the Setup Example 1 for the linear conversion matrix MLTj will be continued. In Step S11, if the m-th MDS matrices L1, L2, ..., Lr on r GF's $(2^n)$ are generated by way of generation processing of the MDS matrices as described with reference to FIG. 11, then the following MDS matrices setting processes are performed.

[Step S12]

Li is set as the linear conversion matrix $MLT_{2i-1}$ of 2i−1 (1≦i≦r) step.

[Step S13]

$MLT_{2r-2i}+1$ is set as the linear conversion matrix $MLT_{2i}$ of 2i−1 (1≦i≦r) step.

For example, in the case of 12 steps (r=6) as shown in FIG. 9 setups are:

MLT1=L1, MLT2=L6
MLT3=L2, MLT4=L5
MLT5=L3, MLT6=L4
MLT7=L4, MLT8=L3
MLT9=L5, MLT10=L2
MLT11=L6, MLT12=L1

In other words, in the Setup Example 1 of the linear conversion matrix MLTj, corresponding to the Feistel type common key block encrypting process structure having the number of steps (the number of rounds) of 2r, r MDS matrices are generated, so that all the square matrices applied in the r linear conversion sections of the F function at the even number rounds are set up as different MDS matrices, and also all the square matrices applied in the r linear conversion sections of the F functions at the odd number rounds are set up as different MDS matrices. Further, the MDS matrices of the even number rounds and the MDS matrix of the odd number round are arranged in the mutually reverse order, so that it is ensured that the encrypting process and the decryption process are the same except for a process of changing the order of the key.

This structure ensures the followings:

(a) the linear conversion matrix of each of the F functions should be MDS, (b) m arbitrary column vectors of the linear conversion matrix included in the odd number rounds in the encrypting function are independent, and (c) m arbitrary column vectors of the linear conversion matrix included in the even number round are independent.

These (a)-(c) are ensured so as not to generate the simultaneous difference cancellation because of m or less active S boxes. Therefore, the minimum value of the number of active S boxes of the entire encrypting function increases.

Thus, according to this example of processing, it is possible to increase the minimum number of the active S boxes in the entire encrypting function, which is the robustness index against the differential attack in the common key block encryption. As a result, the number of the active S boxes at the time of performing the differential analysis (differential attack) increases, and the difficulty of analysis also increases. Therefore, the highly secure encryption is realized in which the key would be difficult to analyze.

Setup Example 2

Linear Conversion Matrix MLTj

As with the Setup Example 1 of the linear conversion matrix MLTj, in the Setup Example 2 of the linear conversion matrix MLTj, corresponding to the Feistel type common key block encrypting process structure having the number of steps (the number of rounds) of 2r, r MDS matrices are generated, and all the square matrices applied in the r linear conversion sections of the F functions at the even number rounds are set up as different MDS matrices, and also all the square matrices applied in the r linear conversion sections of the F functions at the odd number rounds are set up as different MDS matrices. As a result, similar to the Setup Example 1 of the linear conversion matrix MLTj, it provides the MDS matrices (L1, L2 ... L6) setup structure as shown in FIG. 9.

As for this Setup Example 2, in an execution sequence of the Setup Example 1 of the linear conversion matrix MLTj as described above with reference to FIG. 10, a method different from the Setup Example 1 is employed as the MDS matrix generation method in Step S11.

Figure 11:
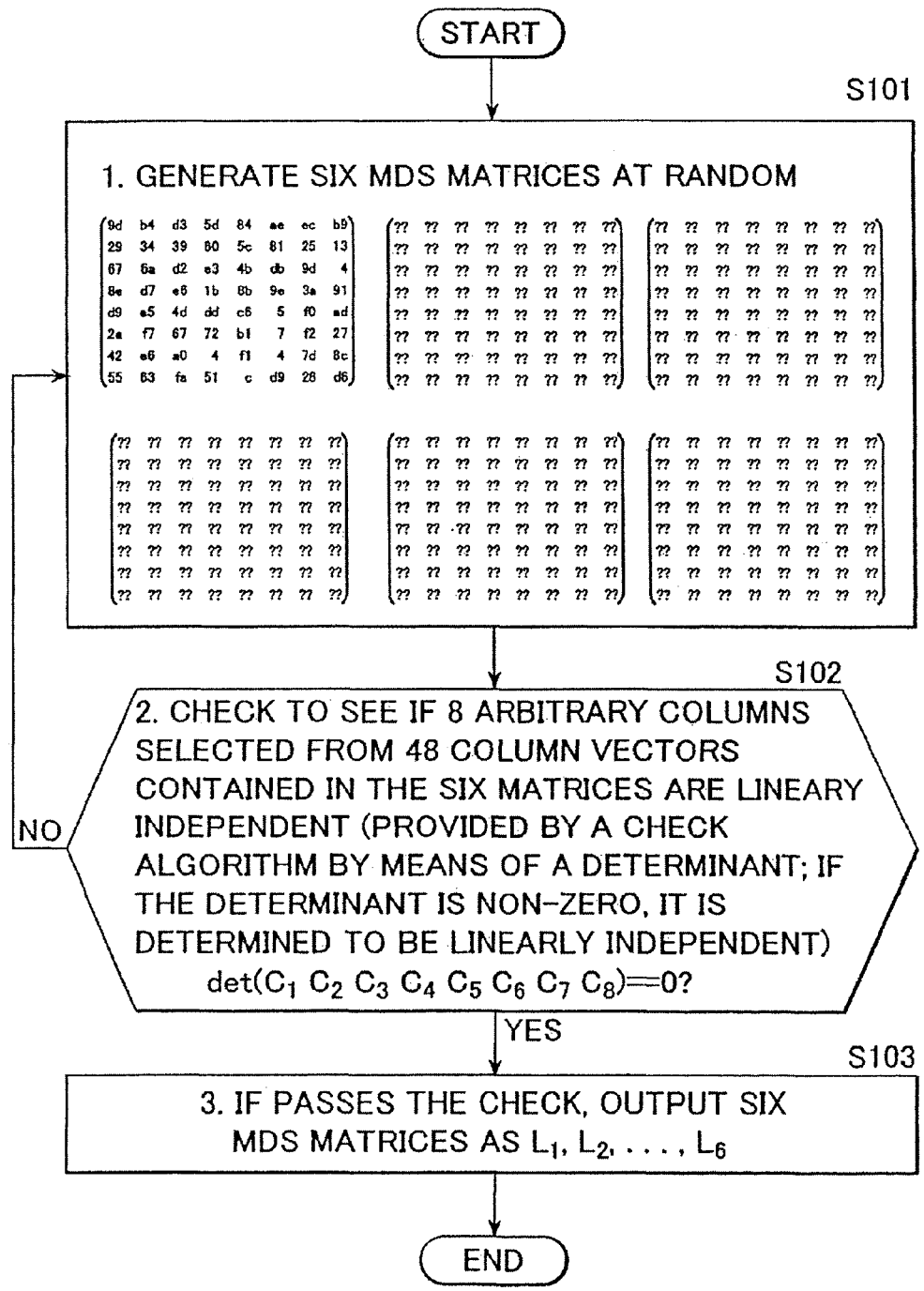
FIG. 11 is a flow chart for explaining a generation method 1 of generating an MDS matrix, which is a linear conversion matrix set as an F function at each round.
Figure 12:
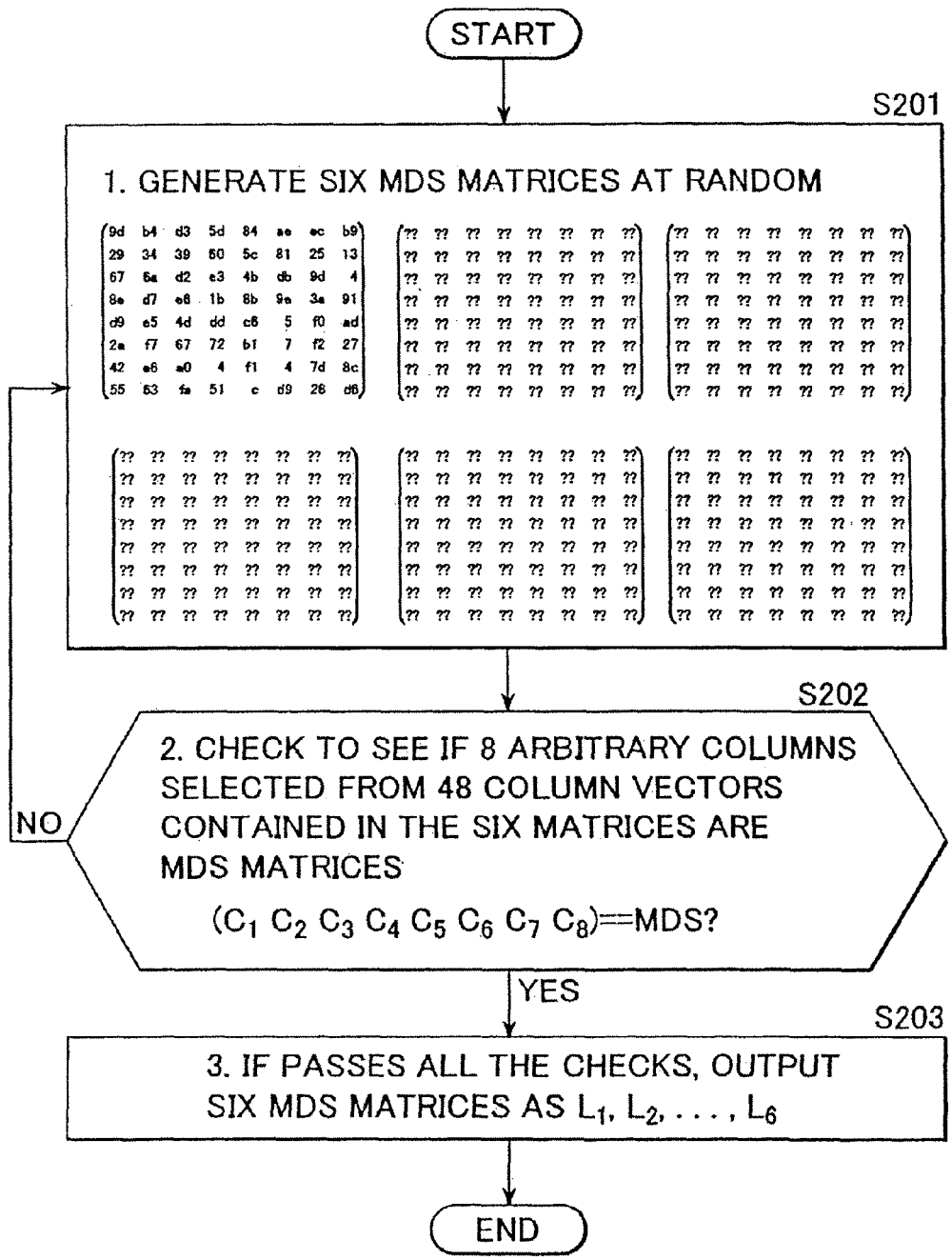
FIG. 12 is a flow chart for explaining a generation method 2 of generating an MDS matrix, which is a linear conversion matrix set as an F function at each round.

As previously described, the method of generating the MDS matrix in the Setup Example 1 of the linear conversion matrix MLTj is a method according to the processing sequence of FIG. 11. In the Setup Example 2 of the linear conversion matrix MLTj, a method (MDS matrix generation method 2) according to the processing sequence as shown in FIG. 12 is employed. The MDS matrix generation method 2 will be described with reference to FIG. 12.

MDS Matrix Generation Method 2

[Step S201]

Input: Assuming that a required number of MDS's is x, expansion order: n, and size of a matrix: m, x pieces of m-th MDS matrices L1, L2, ..., Lx are generated on GF ($2^n$) at random.

[Step S202]

When m arbitrary columns are taken out from xm columns contained in x pieces of m-th MDS matrices L1, L2, ..., Lx, they are checked to see whether they constitute an MDS matrix. If they pass the check, the process goes to Step S203, or otherwise returns to Step S201.

In addition, as described above, by MDS matrix, we mean a matrix which satisfies the following conditions:

(a) It is a square matrix.

(b) No determinant of any submatrix included in the matrix is zero. In other words, det(submatrix)≠0

[Step S203]

The x pieces of m-th MDS matrices L1, L2, ..., Lx are outputted as the MDS matrices applied to the Feistel type common key block encryption having the number of rounds of 2x.

By way of above processes, x pieces of m-th MDS matrices L1, L2, ..., Lx are generated. In this example, x=r.

In the MDS matrix generation processing in the Setup Example 1 of the linear conversion matrix MLTj, as described in the processing sequence of FIG. 11, in Step S102 the linear independence is determined when taking m arbitrary columns from the xm columns contained in x pieces of m-th MDS matrices L1, L2, ..., Lx. In the MDS matrix generation processing in this Setup Example 2 of the linear conversion matrix MLTj, it is determined whether m arbitrary columns when they are taken out from the xm columns contained in x pieces of m-th MDS matrices L1, L2, ..., Lx that constitute an MDS matrix. In other words, a severer check is performed.

Similar to the setup example of the MDS matrix in the Setup Example 1 of the linear conversion matrix MLTj as previously described, x pieces of m-th MDS matrices L1, L2, ..., Lx generated by the MDS matrix generation processing in accordance with, the processing sequence as shown in this FIG. 12, set Li to the linear conversion matrix $MLT_{2i-1}$ at 2i−1 (1≦i≦r) step, and set $MLT_{2r-2i+1}$ to the linear conversion matrix $MLT_{2i}$ at 2i (1≦i≦r) step, so that the Feistel type common key block encrypting process structure is built with the number of steps (the number of rounds) of 2r.

As a result, as shown in FIG. 9, in the case of 12 steps (r=6), the following steps are set up:

MLT1=L1, MLT2=L6
MLT3=L2, MLT4=L5
MLT5=L3, MLT6=L4
MLT7=L4, MLT8=L3
MLT9=L5, MLT10=L2
MLT11=L6, MLT12=L1.

In other words, also in the Setup Example 2 of the linear conversion matrix MLTj, corresponding to the Feistel type common key block encrypting process structure having the number of steps (the number of rounds) of 2r, r MDS matrices are generated, so that all the square matrices applied in the r linear conversion sections of the F functions at the even number rounds are set up as different MDS matrices, and also all the square matrices applied in the r linear conversion sections of the F functions at the odd number rounds are set up as different MDS matrices. However, unlike the Setup Example 1 of the linear conversion matrix MLTj, each of the MDS matrices set up at even steps or odd steps is ensured to be an MDS matrix, when m arbitrary columns are taken out from the xm columns contained in x pieces of m-th MDS matrices L1, L2, ..., Lx. Further, the MDS matrices at the even number rounds and the MDS matrix of the odd number round are arranged in the mutually reverse order, so that it is ensured that the encrypting process and the decryption process are the same except for the process of changing the order of the key.

This structure ensures the followings:

(a) the linear conversion matrix of each of the F functions is an MDS, (b) m arbitrary column vectors of the linear conversion matrices included in the odd number rounds in the encrypting function are MDS matrices, and (c) m arbitrary column vectors of the linear conversion matrices included in the even number rounds are MDS matrices.

These (a)-(c) are ensured so as not to generate the simultaneous difference cancellations because of m or less active S boxes. Further, the following is also ensured:

(d) With the property of MDS, the number of non-zero elements in a difference value obtained due to a (a≦m) pieces of active S boxes is m+1−a or more.

Therefore, the minimum value of the number of active S boxes of the entire encrypting function increases.

Thus, according to this example of processing, it is possible to increase the minimum number of the active S boxes in the entire encrypting function, which is the robustness index against the differential attack in the common key block encryption. As a result, the number of the active S boxes at the time of performing differential analysis (differential attack) increases, and the difficulty of analysis also increases. Therefore, the highly secure encryption is realized in which the key would be difficult to analyze.

Setup Example 3

Linear Conversion Matrix MLTj

Similar to the Setup Examples 1 and 2 of the linear conversion matrix MLTj, in the Setup Example 3 of the linear conversion matrix MLTj, corresponding to the Feistel type common key block encrypting process structure having the number of steps (the number of rounds) of 2r, r MDS matrices are generated, so that all the square matrices applied in the r linear conversion sections of the F functions at the even number rounds are set up as different MDS matrices, and also all the square matrices applied in the r linear conversion sections of the F functions at the odd number rounds are set up as different MDS matrices. As a result, similar to the Setup Example 1 of the linear conversion matrix MLTj, it provides the MDS matrices (L1, L2 ... L6) setup structure as shown in FIG. 9.

In this Setup Example 2, the method different from those in the Setup Examples 1 and 2 is applied in the execution sequence of the Setup Example 1 of the linear conversion matrix MLTj as described above with reference to FIG. 10, as the generation method of the MDS matrix of Step S11.

Figure 13:
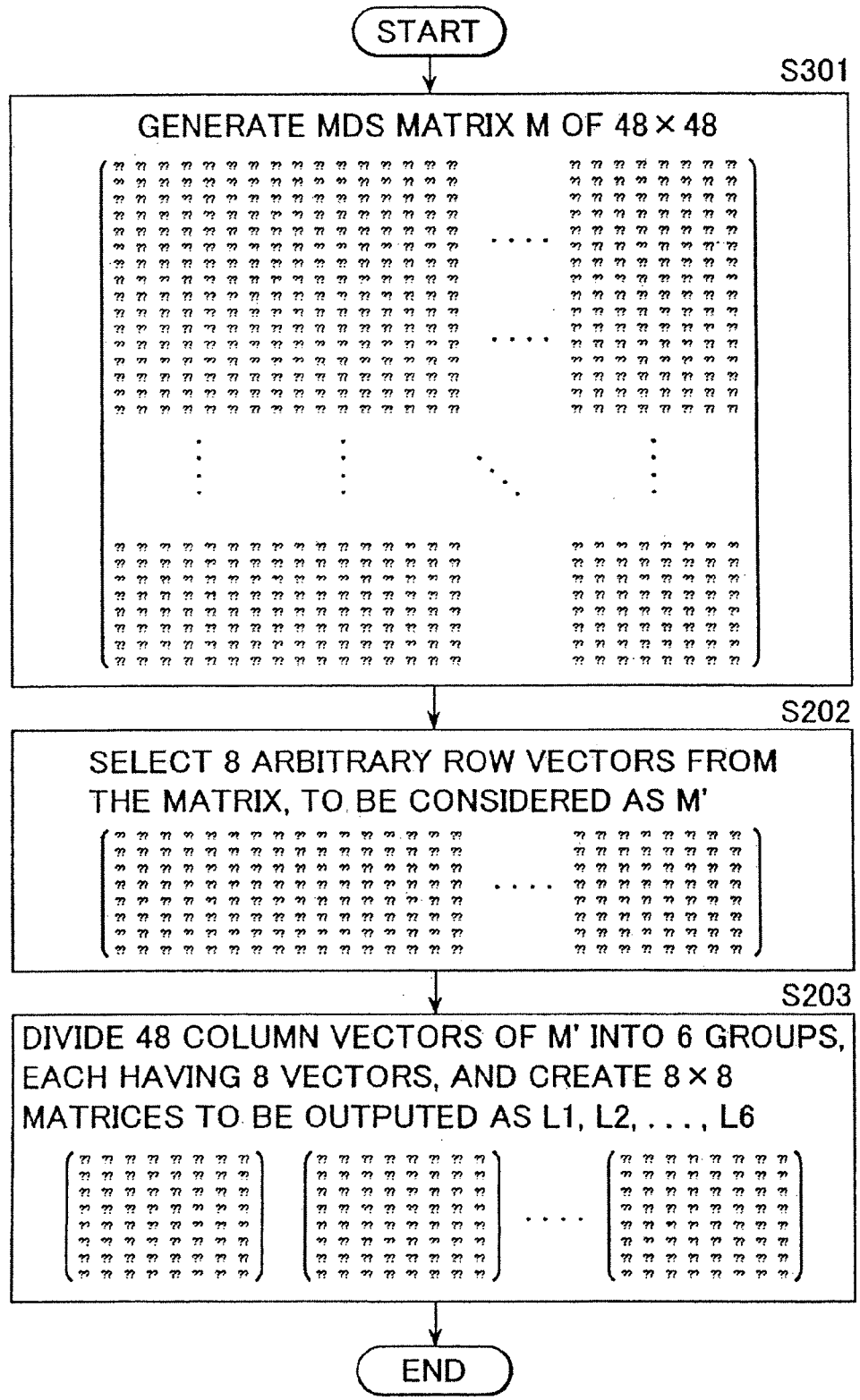
FIG. 13 is a flow chart for explaining a generation method 3 of generating an MDS matrix, which is a linear conversion matrix set as an F function at each round.

In the Setup Example 3 of the linear conversion matrix MLTj, a method (MDS matrix generation method 3) according to the processing sequence as shown in FIG. 13 is applied. The MDS matrix generation method 3 will be described with reference to FIG. 13.

MDS Matrix Generation Method 3

[Step S301]

Input: Assuming that a required number of MDS's is x, expansion order: n, and size of a matrix: m, an xm-th MDS matrix M is generated on GF ($2^n$).

[Step S302]

m rows are arbitrarily selected and extracted from one xm-th MDS matrix M, so that the Matrix M' of m rows and xm columns is constructed.

[Step S303]

Without overlapping, xm column vectors contained in the matrix M' of m rows and xm columns are arbitrarily divided into x groups including m column vectors. The m-th square matrices L1, L2, . . . , Lx are outputted from the column vectors contained in respective groups, as an MDS matrix applied to the Feistel type common key block encryption having the number of rounds 2x.

By way of the above processes, x pieces of m-th MDS matrices Li, Lx are generated. Further, in this example, x=r.

The MDS matrix generation method 3 will be described more particularly with reference to FIG. 14.

[Step S301]

An xm-th MDS matrix M is generated on GF ($2^n$). As shown in FIG. 14, the MDS matrix M of xm×xm is generated. In addition, the order of the matrix M generated in this Step S301 may be greater than xm-th.

[Step S302]

Figure 14:
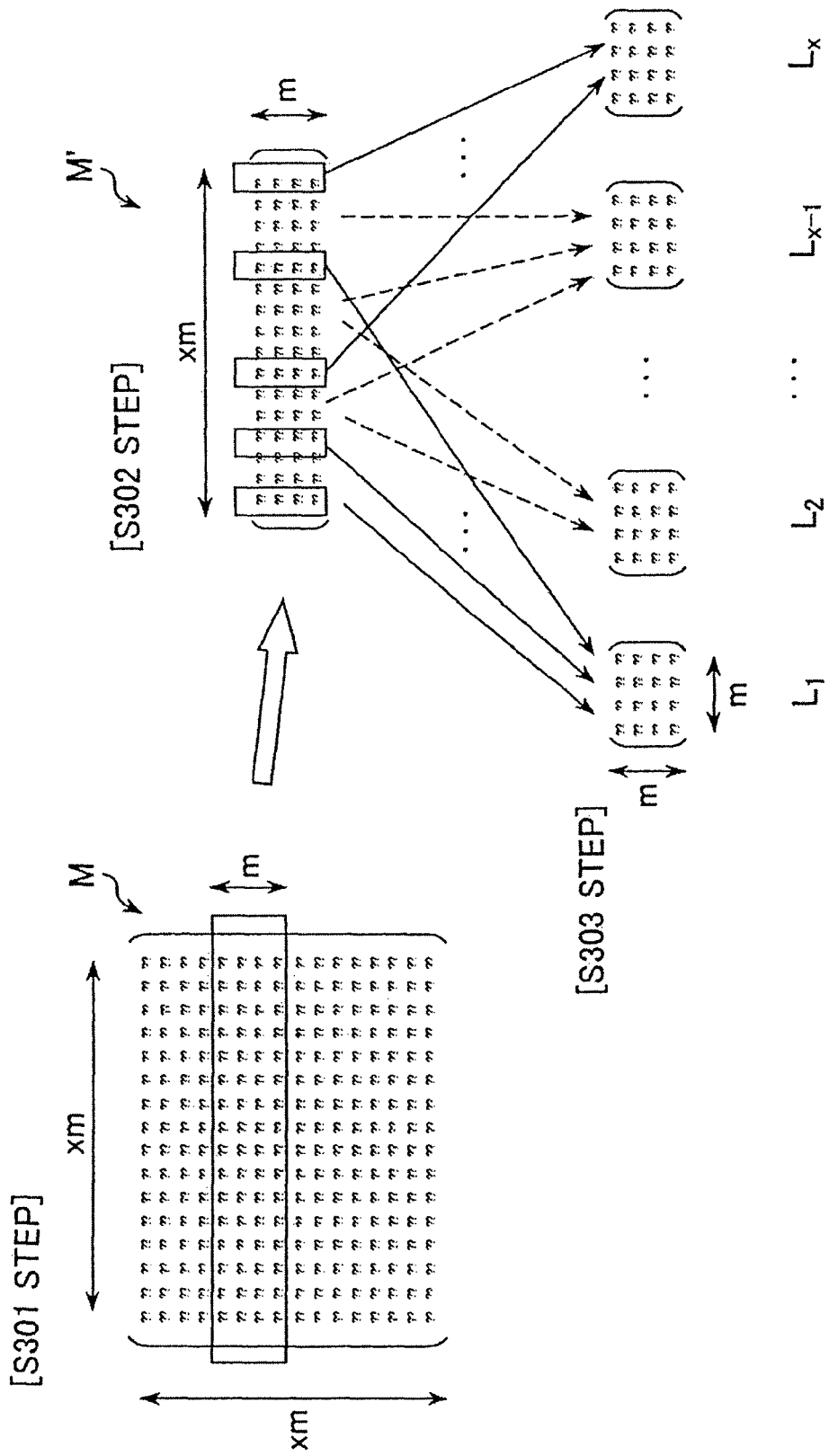
FIG. 14 is a chart for explaining a particular method of the generation method 3 of the MDS matrix, which is the linear conversion matrix set as the F function at each round.

As shown in FIG. 14, m rows are arbitrarily selected and extracted from the xm-th MDS matrix M, so as to constitute the matrix M' of m rows and xm columns. In addition, although the example as shown in the figure shows that m consecutive rows are selected and extracted by way of example, m separate rows, which constitute the m-th MDS matrix M, may arbitrarily be selected and extracted so as to constitute the matrix M' of m rows and xm columns.

[Step S303]

Without overlapping, the xm column vectors contained in the matrix M' of in rows and xm columns are arbitrarily divided into x groups which include m column vectors. The m-th square matrices L1, L2, . . . , Lx are generated from the column vectors contained in each group.

Similar to the MDS matrix setup examples in the Setup Examples 1, 2 of the linear conversion matrix MLTj as previously described, as for x pieces of m-th MDS matrices L1, L2, . . . , Lx generated by the MDS matrix generation process according to the processing sequence as described with reference to FIG. 13, FIG. 14, Li is set as the linear conversion matrix $MLT_{2i-1}$ at 2i−1 ($1 \leq i \leq r$) step, and $MLT_{2r-2i+1}$ is set as the linear conversion matrix $MLT_{2i}$ at 2i ($1 \leq i \leq r$) step, so that the Feistel type common key block encrypting process structure having the number of steps (the number of rounds) of 2r is built.

As a result, as shown in FIG. 9, in the case of 12 steps (r=6), the following steps are set up:

MLT1=L1, MLT2=L6
MLT3=L2, MLT4=L5
MLT5=L3, MLT6=L4
MLT7=L4, MLT8=L3
MLT9=L5, MLT10=L2
MLT11=L6, MLT12=L1.

In other words, in the Setup Example 3 of the linear conversion matrix MLTj, corresponding to the Feistel type common key block encrypting process structure having the number of steps (the number of rounds) of 2r, r MDS matrices are generated, so that all the square matrices applied in the r linear conversion sections of the F functions at the even number rounds are set up as different MDS matrices, and all the square matrices applied in the r linear conversion sections of the F functions at the odd number rounds are also set up as different MDS matrices. Further, the MDS matrices at the even number rounds and the MDS matrices at the odd number rounds are arranged in the mutually reverse order, so that it is ensured that the encrypting process and the decryption process are the same except for the process of changing the order of the key.

This structure ensures the following:

(a) the linear conversion matrix of each of the F functions is an MDS, (b) m arbitrary column vectors of the linear conversion matrices included in the odd number rounds in the encrypting function are independent, and (c) m arbitrary column vectors of the linear conversion matrices included in the even number rounds are independent.

These (a)-(c) are ensured so as not to generate the simultaneous difference cancellations because of m or less active S boxes.

Further, the following also holds.

(d) from the property of MDS, it is ensured that the number of non-zero elements in a difference value obtained due to a ($a \leq m$) pieces of active S boxes is m+1−a or more. Therefore, the minimum value of the number of active S boxes of the entire encrypting function increases.

The Setup Example 3 of the linear conversion matrix MLTj especially exerts an effect when m and r are large, a time cost concerning matrix determination processing (systems 1 and 2) in the processing Examples 1 and 2 as described above is considerably high, and it is difficult to determine a matrix within practical time scale. Even in such a case, the MDS matrix generation method of this processing Example 3 allows the matrix generation process to be attained in a relatively short time.

This is because, in the MDS matrix generation method 3, a system can be applied which can sufficiently be processed in the practical time scale even with respect to the larger numbers of m and r, for example, a system of generating the generation matrix of the Reed Solomon code.

Also in this Setup Example 3 of the linear conversion matrix MLTj, as described above, it is possible to increase the minimum number of the active S boxes in the entire encrypting function, which is a robustness index against the differential attack in the common key block encryption. As a result, the number of the active S boxes at the time of performing differential analysis (differential attack) increases, and the difficulty of analysis also increases. Therefore, the highly secure encryption is realized in which the key would be difficult to analyze.

Setup Example 4

Linear Conversion Matrix MLTj

In the Setup Examples 1-3 of the linear conversion matrix MLTj as described above, corresponding to the Feistel type common key block encrypting process structure having the number, of steps (the number of rounds) of 2r, r MDS matrices are generated, so that all the square matrices applied in the r linear conversion sections of the F functions at the even number rounds are set up as different MDS matrices, and all the square matrices applied in the r linear conversion sections of the F functions at the odd number rounds are also set up as different MDS matrices. Hereinafter, an example of a structure will be described in which, corresponding to the Feistel type common key block encrypting process structure having the number of steps (the number of rounds) of 2r, q pieces (fewer than r pieces) of MDS matrices are generated so as to achieve an effect similar to that of the Setup Example 1 of the linear conversion matrix MLTj as described above, that is, the minimum number of the active S boxes is increased in the entire encrypting function.

Figure 15:
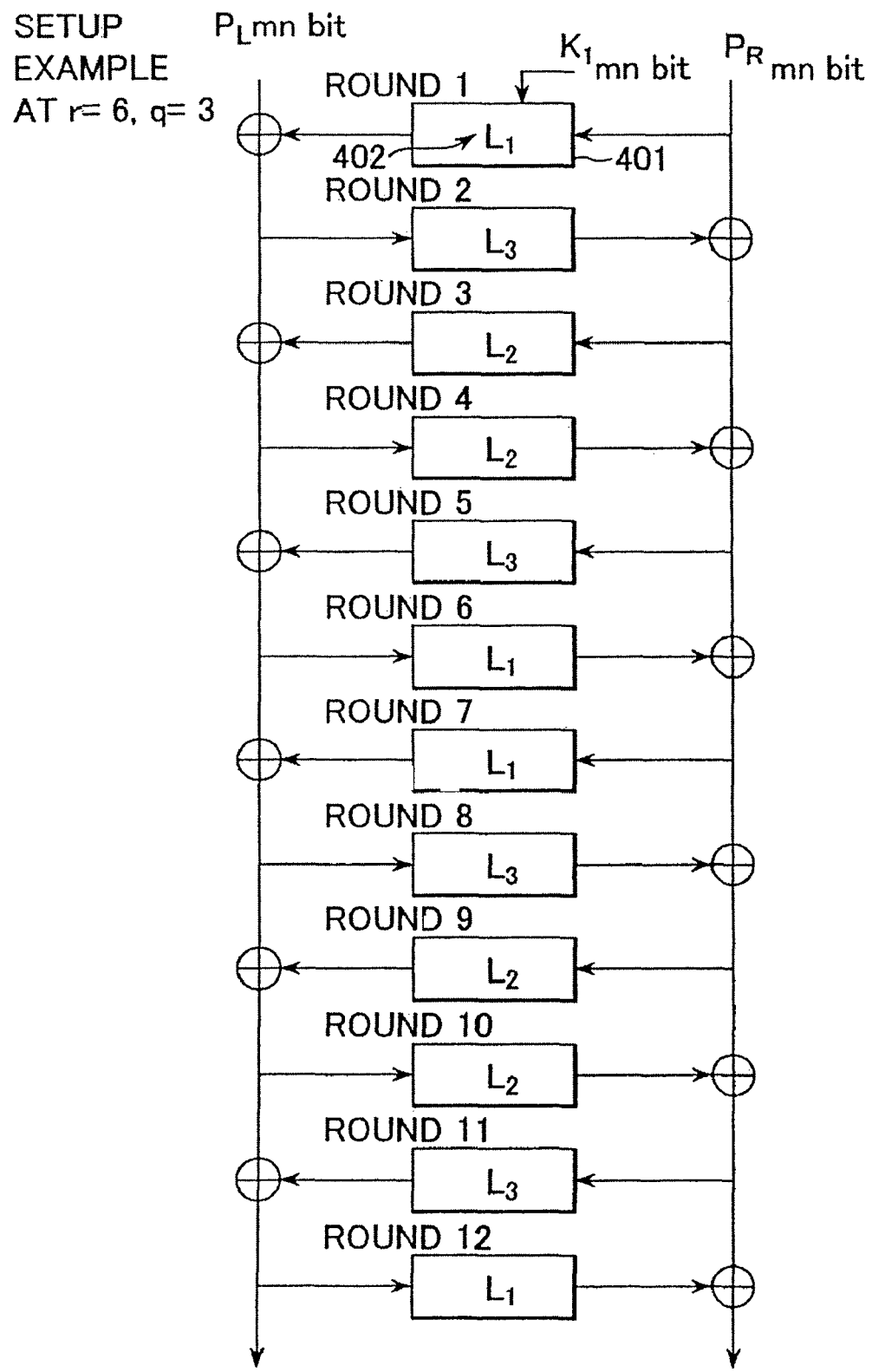
FIG. 15 is a diagram for explaining an setup example of the MDS matrix as the linear conversion matrix of the F function at each round in the common key block encrypting algorithm in accordance with an embodiment of the present invention.

An example of a structure which employs this Setup Example is shown in FIG. 15. As an example of a structure in which, the number of steps (the number of rounds) is 2r=12, namely, when it is considered as the Feistel type common key block encrypting process structure where r=6, q=3 or three types of different MDS matrices are arranged in the Feistel type common key block encrypting process structure with the round number of 12 steps, FIG. 15 shows MDS matrices (L1, L2, L3) set in the linear conversion sections of the F function sections of respective rounds.

The structure of FIG. 9 is a structure where the plain text of 2 nm bits is divided into two data $P_L$ (Plain-Left) and $P_R$ (Plain-Right) of mn bits, and provided as input values for the F function to be performed at each round. As described above with reference to FIG. 2, any of the F function 401 at first round and the F functions at other round is an F function having the nonlinear conversion section constituted by the S boxes and the SPN type to which the linear conversion section is connected.

In the Setup Example of FIG. 15, r=6 and q=3, so that the symbol Ln as shown in each F function indicates an MDS matrix 402. In other words, L1, L2, and L3 respectively indicate three different types of MDS matrices, and indicate the MDS matrix applied to the linear conversion process in the linear conversion section of each F function.

According to this example of processing, a simple structure is realized which is needed in the Setup Examples 1-3 of the linear conversion matrix MLTj as described above, and which reduces the number of the different MDS matrices.

Figure 16:
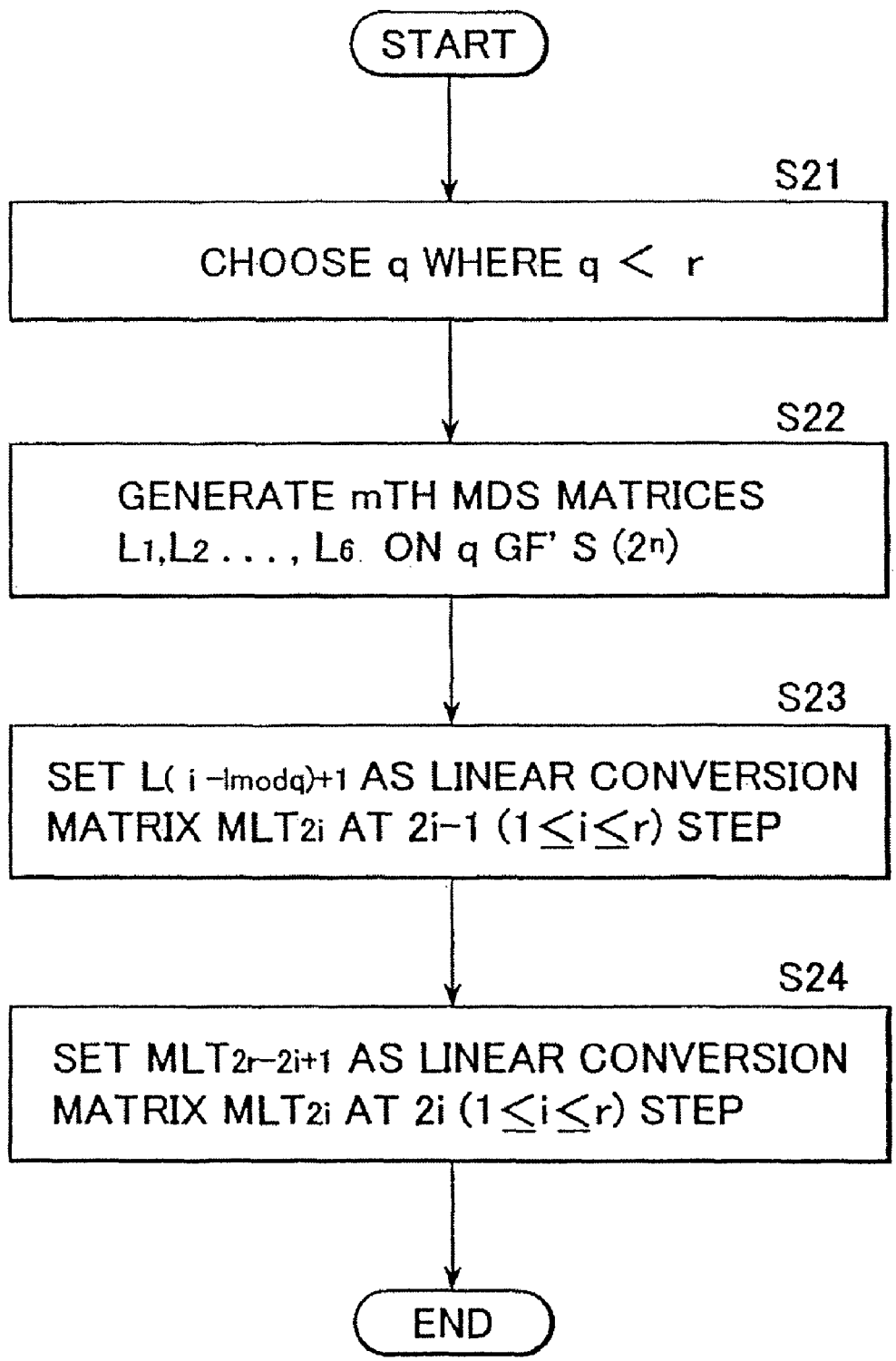
FIG. 16 is a flow chart for explaining the MDS matrix setup processing sequence as the linear conversion matrix of the F function at each round in the common key block encrypting algorithm in accordance with an embodiment of the present invention.

A processing sequence of the Setup Example 4 of the linear conversion matrix MLTj will be described with reference to FIG. 16.

[Step S21]

The number q is selected where q is smaller than r which is one half of the number of rounds 2r, namely q<r (where q is an integer of two or more).

[Step S22]

q pieces of m-th MDS matrices L1, L2, ..., Lq on GF's ($2^n$) are generated.

As the generation processing method of the q pieces of m-th MDS matrices L1, L2, ..., Lq on GF's (2), the MDS matrix generation method 1 (FIG. 11) is employed. In other words, q pieces of m-th MDS matrices L1, L2, ..., Lq are generated on GF (2), the linear independence is determined when taking m arbitrary columns from qm columns contained in q pieces of the generated m-th MDS matrices L1, L2, ..., Lq, and the q pieces of m-th MDS matrices L1, L2, ..., Lq are set in the linear conversion section of the F function section at each round.

In Step S22 when the q pieces of m-th MDS matrices L1, L2, ..., Lq on GF's ($2^n$) are generated by way of the generation process of the MDS matrix by employing the MDS matrix generation method 1, then the following MDS matrix setup processes are performed.

[Step S23]

$L_{(i-1 \bmod q)+1}$ is set as the linear conversion matrix $MLT_{2i-1}$ at 2i−1 (1≦i≦r) step.

[Step S24]

$MLT_{2r-2i+1}$ is set as the linear conversion matrix $MLT_{2i}$ at 2i (1≦i≦r) step.

For example, in the example of structure as shown in FIG. 15 or there are 12 steps (r=6), when q=3, the following steps are set up:

MLT1=L1, MLT2=L3
MLT3=L2, MLT4=L2
MLT5=L3, MLT6=L1
MLT7=L1, MLT8=L3
MLT9=L2, MLT10=L2
MLT11=L3, MLT12=L1

In other words, in the Setup Example 4 of the linear conversion matrix MLTj, corresponding to the Feistel type common key block encrypting process structure having the number of steps (the number of rounds) of 2r, q (fewer than r) MDS matrices are generated, so that the square matrices applied in the r linear conversion sections of the F function at the even number rounds are set up as q different MDS matrices one by one, and the square matrices applied in the r linear conversion sections of the F functions at the odd number rounds are also, adapted to set up q different MDS matrices one by one. Further, the MDS matrices at the even number rounds and the MDS matrices at the odd number rounds are arranged in the mutually reverse order, so that it is ensured that the encrypting process and the decryption process are the same except for the process of changing the order of the key.

This structure ensures the following:

(a) the linear conversion matrix of each F function is an MDS, (b) m arbitrary column vectors of the linear conversion matrices included in at least consecutive q pieces of F functions which are in the odd number rounds within the encrypting function are independent, and (c) m arbitrary column vectors of the linear conversion matrix included in at least consecutive q pieces of F functions in the even number rounds are independent.

These (a)-(c) are secured, so that as for the Feistel type common key block encrypting process structure having the number of rounds of plural steps, an effect corresponding to the Setup Example 1 of the linear conversion matrix MLTj as described above can be obtained at consecutive 2q−1 rounds.

In other words, at the consecutive 2q−1 rounds, it is ensured that the simultaneous difference cancellation will not be generated because of m or less active S boxes. Therefore, the minimum value of the number of active S boxes of the entire encrypting function increases.

Thus, according to this example of processing, it is possible to increase the minimum number of the active S boxes in the entire encrypting function, which is the robustness index against the differential attack in the common key block encryption. As a result, the number of the active S boxes at the time of performing differential analysis (differential attack) increases, and the difficulty of analysis also increases. Therefore, the highly secure encryption is realized in which the key would be difficult to analyze.

Further, in this example of processing there is an effect that the types of matrix required for the encrypting function can be decreased to q types, so as to reduce software in code size and hardware in gate scale.

Setup Example 5

Linear Conversion Matrix MLTj

An example of a structure will be described in which, as to the Setup Example 5 of the linear conversion matrix MLTj, similar to the Setup Example 4 of the linear conversion matrix MLTj as described above, corresponding to the Feistel type common key block encrypting process structure having the number of steps (the number of rounds) of 2r, q pieces (fewer than r pieces) of MDS matrices are generated so as to achieve an effect similar to that of the Setup Example 2 of the linear conversion matrix MLTj as described above, that is, the minimum number of the active S boxes is increased in the entire encrypting function.

The example of structure which employs this Setup Example is similar to the Setup Example 4. For example, in the case of r=6 and q=3, the MDS matrices (L1, L2, L3) are setup as shown in FIG. 15.

This example of processing employs the MDS matrix generation method 2 as previously described with reference to FIG. 12, as the generation method of the MDS matrix of Step S21, in the execution sequence of the Setup Example 4 of the linear conversion matrix MLTj as described with reference to FIG. 16.

In other words, in the Setup Example 4, in the generation of MDS matrices, the linear independence is determined when taking m arbitrary columns from the qm columns contained in the q pieces of m-th MDS matrices L1, L2, . . . , Lq. In this Setup Example 5 of the linear conversion matrix MLTj, when m arbitrary columns are taken out of the qm columns contained in the q pieces of m-th MDS matrices L1, L2, . . . , Lq, they are checked to see whether they constitute an MDS matrix. In other words, a severer check is performed so as to generate the q pieces of m-th MDS matrices L1, L2, . . . , Lq.

The q pieces of m-th MDS matrices L1, L2, . . . , Lq generated by the MDS matrix generation processing according to the processing sequence as shown in FIG. 12 are set up by the setup process similar to that of the setup example of an MDS matrix in the Setup Example 4 of the linear conversion matrix MLTj as previously described. In other words, $L_{(i-1 \bmod q)+1}$ is set as the linear conversion matrix $MLT_{2i-1}$ at 2i−1 (1≦i≦r) step, and $MLT_{2r-2i+1}$ is set as the linear conversion matrix $MLT_{2i}$ at 2i (1≦i≦r) step.

As a result of this setting processing, for example, in the example of structure as shown in FIG. 15, that is, in the case of 12 steps (r=6) and q=3, the following steps are set up:

MLT1=L1, MLT2=L3
MLT3=L2, MLT4=L2
MLT5=L3, MLT6=L1
MLT7=L1, MLT8=L3
MLT9=L2, MLT10=L2
MLT11=L3, MLT12=L1

In other words, similar to the Setup Example 4 of the linear conversion matrix MLTj, also in the Setup Example 5 of the linear conversion matrix MLTj, corresponding to the Feistel type common key block encrypting process structure having the number of steps (the number of rounds) of 2r, q (fewer than r) MDS matrices are generated, so that the square matrices applied in the r linear conversion sections of the F function at the even number rounds are set up as q different MDS matrices one by one, and the square matrices applied in the r linear conversion sections of the F functions at the odd number rounds are also adapted to set up q different MDS matrices one by one. Further, the MDS matrices at the even number rounds and the MDS matrices at the odd number rounds are arranged in the mutually reverse order, so that it is ensured that the encrypting process and the decryption process are the same except for the process of changing the order of the key.

This structure ensures the following:

(a) the linear conversion matrix of each F function is an MDS, (b) m arbitrary column vectors of the linear conversion matrices included in at least consecutive q pieces of F functions which are in the odd number rounds within the encrypting function are MDS matrices, and (c) m arbitrary column vectors of the linear conversion matrix included in at least consecutive q pieces of F functions in the even number rounds are MDS matrices.

These (a)-(c) are secured, so that as for the Feistel type common key block encrypting process structure having the number of rounds of plural steps, an effect corresponding to the Setup Example 2 of the linear conversion matrix MLTj as described above can be obtained at consecutive 2q−1 rounds.

In other words, at the consecutive 2q−1 rounds, it is ensured that the simultaneous difference cancellation will not be generated because of m or less active S boxes. Further, the following is ensured.

(d) from the property of MDS, the number of non-zero elements in a difference value obtained due to a (a≦m) pieces of active S boxes is m+1−a or more. Therefore, the minimum value of the number of active S boxes of the entire encrypting function increases.

Thus, according to this example of processing, it is possible to increase the minimum number of the active S boxes in the entire encrypting function, which is the robustness index against the differential attack in the common key block encryption. As a result, the number of the active S boxes at the time of performing differential analysis (differential attack) increases, and the difficulty of analysis also increases. Therefore, the highly secure encryption is realized in which the key would be difficult to analyze.

Further, in this example of processing there is an effect that the types of matrix required for the encrypting function can be decreased to q types, so as to reduce software in code size and hardware in gate scale.

Setup Example 6

Linear Conversion Matrix MLTj

An example of a structure will be described in which, as to the Setup Example 6 of the linear conversion matrix MLTj, similar to the Setup Examples 4 and 5 of the linear conversion matrix MLTj as described above, corresponding to the Feistel type common key block encrypting process structure having the number of steps (the number of rounds) of 2r, q pieces (fewer than r pieces) of MDS matrices are generated so as to achieve an effect similar to that of the Setup Example 3 of the linear conversion matrix MLTj as described above, that is, the minimum number of the active S boxes is increased in the entire encrypting function.

The example of structure which employs this Setup Example is similar to the Setup Examples 4 and 5. For example, in the case of r=6 and q=3, the MDS matrices (L1, L2, L3) are setup as shown in FIG. 15.

This example of processing employs the MDS matrix generation method 3 as previously described with reference to FIG. 13 and FIG. 14, as the generation method of the MDS matrix of Step S21, in the execution sequence of the Setup Example 4 of the linear conversion matrix MLTj as described with reference to FIG. 16.

In other words, one qm-th MDS matrix M is generated on GF ($2^n$), and m rows are arbitrarily selected and extracted from one qm-th MDS matrix M so as to constitute the matrix M' of m rows and qm columns Then, without overlapping, the qm column vector contained in the matrix M' of m rows and qm columns are arbitrarily divided into q groups which have m column vectors. The m-th square matrices L1, L2, . . . , Lq are outputted from the column vectors contained in each group, as MDS matrices to be applied to the Feistel type common key block encryption.

The q pieces of m-th MDS matrices L1, L2, . . . , Lq generated by the MDS matrix generation processing according to the processing sequences as shown in FIG. 13 and FIG. 14 are set up, similar to the setup example of an MDS matrix in the Setup Example 4 of the linear conversion matrix MLTj as previously described. In other words, $L_{(i-1 \bmod q)+1}$ is set as the linear conversion matrix $MLT_{2i-1}$ at 2i−1 (1≦i≦r) step, and $MLT_{2r-2i+1}$ is set as the linear conversion matrix $MLT_{2i}$ at 2i (1≦i≦r) step.

As a result of this setting process, for example, in the example of structure as shown in FIG. 15, that is, in the case of 12 steps (r=6) and q=3, the following steps are set up:
MLT1=L1, MLT2=L3
MLT3=L2, MLT4=L2
MLT5=L3, MLT6=L1
MLT7=L1, MLT8=L3
MLT9=L2, MLT10=L2
MLT11=L3, MLT12=L1.

In other words, similar to the Setup Examples 4 and 5 of the linear conversion matrix MLTj, also in the Setup Example 6 of the linear conversion matrix MLTj, corresponding to the Feistel type common key block encrypting process structure having the number of steps (the number of rounds) of 2r, q (fewer than r) MDS matrices are generated, so that the square matrices applied in the r linear conversion sections of the F function at even number rounds are set up as q different MDS matrices one by one, and the square matrices applied in the r linear conversion sections of the F functions at the odd number rounds are also adapted to set up q different MDS matrices one by one. Further, the MDS matrices at even number rounds and the MDS matrices at the odd number rounds are arranged in the mutually reverse order, so that it is ensured that the encrypting process and the decryption process are the same except for the process of changing the order of the key.

This structure ensures the following:

(a) the linear conversion matrix of each F function is an MDS, (b) m arbitrary column vectors of the linear conversion matrices included in at least consecutive q pieces of F functions which are in the odd number rounds within the encrypting function are independent, (c) m arbitrary column vectors of the linear conversion matrix included in at least consecutive q pieces of F functions in the even number rounds are independent.

These (a)-(c) are secured, so that as for the Feistel type common key block encrypting process structure having the number of rounds of plural steps, an effect corresponding to the Setup Example 3 of the linear conversion matrix MLTj as described above can be obtained at consecutive 2q−1 rounds.

In other words, at the consecutive 2q−1 rounds, it is ensured that the simultaneous difference cancellation will not be generated because of m or less active S boxes. Further, the following is also ensured:

(d) from the property of MDS, the number of non-zero elements in a difference value obtained due to a (a≦m) pieces of active S boxes is m+1−a or more at the consecutive rounds 2q−1. Therefore, the minimum value of the number of active S boxes of the entire encrypting function increases.

Thus, according to this example of processing, it is possible to increase the minimum number of the active S boxes in the entire encrypting function, which is the robustness index against the differential attack in the common key block encryption. As a result, the number of the active S boxes at the time of performing differential analysis (differential attack) increases, and the difficulty of analysis also increases. Therefore, the highly secure encryption is realized in which the key would be difficult to analyze.

In addition, according to the Setup Example 6 of the linear conversion matrix MLTj, similar to the Setup Example 3 of the linear conversion matrix MLTj as previously described, when m and r are large, the time cost concerning the matrix generation methods 1 and 2 is considerably high, and it is difficult to determine a matrix within practical time scale, makes it possible to carry out the matrix generation process in a relatively short time. This is because, as described above, in the MDS matrix generation method 3, a system such as a system of generating the generation matrix of the Reed Solomon code can be applied in such a way that it can sufficiently perform the process in the practical time scale even with respect to the larger numbers of m and r.

Similar to the Setup Examples 4 and 5, in this example of processing, there is an effect that the types of matrix required for the encrypting function can be decreased to q types, so as to reduce software in code size and hardware in gate scale.

Figure 17:
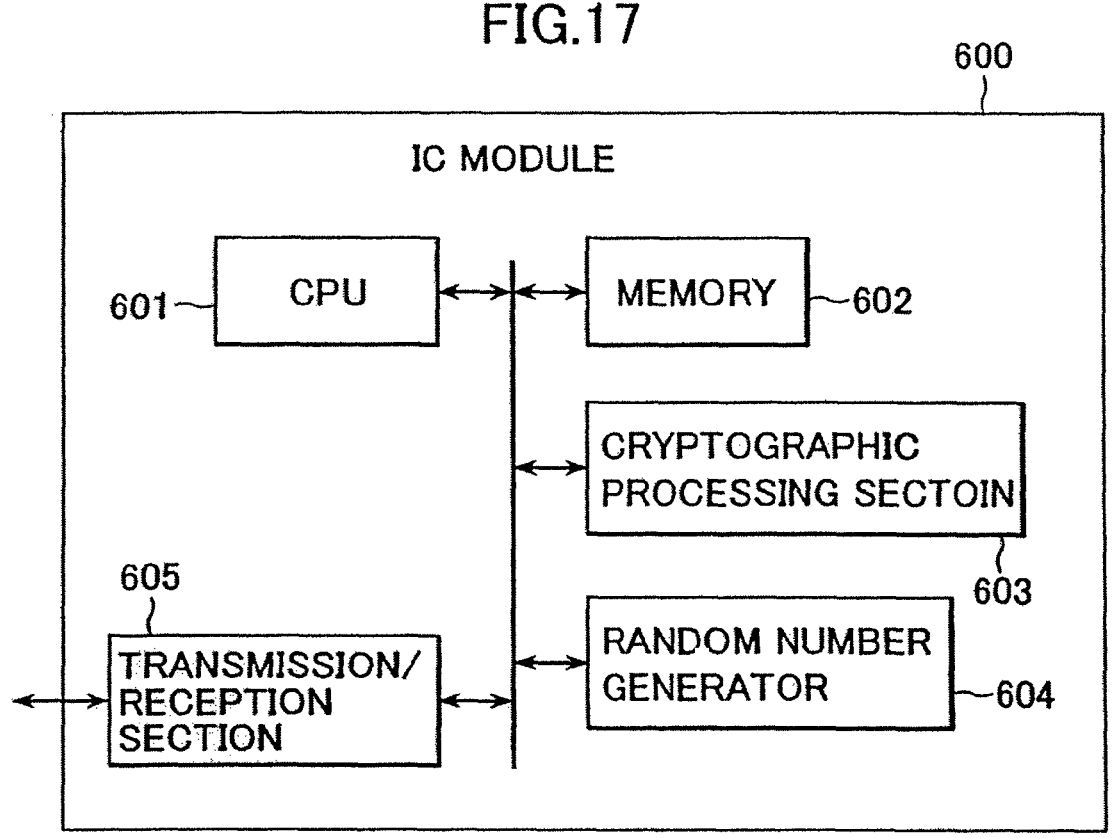
FIG. 17 is a diagram showing an example of a structure of an IC module as a cryptographic processing apparatus that performs encrypting in accordance with an embodiment of the present invention.

Finally, an example of a structure of an IC module 600 as a cryptographic processing apparatus which performs encrypting process is shown in FIG. 17. The above-mentioned process can be carried out on a PC, an IC card, a reader/writer, and other various information processing apparatuses, for example. The IC module 600 as shown in FIG. 17 can be arranged in these various apparatus.

A CPU (Central processing Unit) 601 as shown in FIG. 17 is a processor which starts and terminates encrypting, controls transmission and reception of data, controls data transfer among respective components, and executes other various programs. A memory 602 includes a ROM (Read-Only-Memory) where a program executed by the CPU 601 or a fixed data as an operation parameter is stored, a RAM (Random Access Memory) used as a storage area or a work area where a program which is executed during the process by means of the CPU 601 and a parameter which changes suitably in the program processing are stored. Further, the memory 602 can be used as a storage area for a key data required for encrypting etc. It is preferable that the storage area for data etc. is constructed as a memory with a tamper resistant structure.

An encrypting section 603 performs encrypting, decoding, etc. according to the above-mentioned Feistel type common key block encrypting process algorithm, for example. In addition, although the example where an encrypting means is an individual module has been shown herein, such an independent encrypting module may not be provided. For example, an encrypting program may be stored in the ROM, so that the CPU 601 may read and perform the ROM-stored program.

A random number generator 604 carries out a random number generation process which is needed when generating the key needed for encrypting etc.

A transmission/reception section 605 is a data communication processing section which performs external data communication, for example, carries out the data communication with an IC module, such as the reader/writer etc so as to output a cipher text generated in the IC module, or performs data input from an apparatus, such as an external reader/writer, etc.

With reference to specific examples, the present invention has been described in detail hereinbefore. However, it is obvious that a person skilled in the art can modify and substitute the examples without departing from the scope of the present invention. In other words, the present invention has been disclosed by way of examples, and the description of the specification should not be construed as limiting. In order to determine the feature of the present invention, the claims as recited at the front should be considered.

In addition, a series of processes as described in the specification can be performed by way of hardware, software, or a combination of these. When carrying out a process by way of software, a program having recorded a processing sequence can be installed in a memory in a computer built in a dedicated hardware apparatus, or alternatively it is possible to make a general purpose computer which can perform various processes install and perform the program.

For example, the program can be recorded beforehand in a hard disk or the ROM (Read Only Memory) as a recording medium. Alternatively, the program can permanently or temporarily be stored (recorded) in a removable recording medium, such as a flexible disk, a CD-ROM (Compact Disc Read Only Memory), an MO (Magneto optical) disk, a DVD (Digital Versatile Disc), a magnetic disk, a semiconductor memory, etc. Such a removable recording medium can be provided as so-called packaged software.

In addition, the program can be installed in a computer through a removable recording medium as described above, wirelessly transmitted to the computer from a download site, or transmitted to the computer through a wired line or via a network, such as a LAN (Local Area Network), a network called the Internet. The computer can receive the thus transmitted program to be installed in the recording media, such as a built-in hard disk.

In addition, various processes as described in the specification may not only be performed in chronological order according to the description but also be carried out in parallel or individually, as needed or according to throughput capacity of a apparatus which performs the process. Further, in this specification, by a system we mean a logical group structure of a plurality of apparatuses, so that every apparatus is not necessarily provided in the same casing.

As described above, according to the embodiments of the present invention, in the Feistel type common key block encrypting process in which the SPN type F function having the nonlinear conversion section and the linear conversion section is repeatedly executed the plurality of rounds, the linear conversion process of the F function corresponding to each of the plurality of rounds is performed as the linear conversion process which employs the MDS (Maximum Distance Separable) matrix, and the linear conversion process is carried out which employs the different MDS matrix at least at each of the consecutive odd number rounds and the consecutive even number rounds, so that the possibility of occurrence of simultaneous difference cancellations caused by an active S box is reduced or removed, whereby it becomes possible to increase the minimum number (a robustness index against the differential attack in the common key block encryption) of the active S box in the entire encrypting function. In other words, the number of the active S boxes at the time of performing the differential analysis (differential attack) increases, and the difficulty of analyzing an encryption key etc. increases, whereby the robustness against the differential analysis is high and highly secure encryption processing can be realized. Therefore, it is applicable to an encryption processing apparatus in which the difficulty of analyzing the key increases and security is required.

It should be understood by those skilled in the art that various modifications, combinations, sub-combinations and alterations may occur depending on design requirements and other factors insofar as they are within the scope of the appended claims or the equivalents thereof.

What is claimed is:

1. A cryptographic processing system, comprising:
a processor; and
a memory storing a program that when executed by the processor, performs a first predetermined number of rounds of transformations, each round of transformation comprising:
performing, by a nonlinear conversion layer, a nonlinear transformation of input information and outputs first output information; and
performing, by a linear conversion layer, a linear transformation of the first output information based on a linear conversion matrix,
wherein the program performs a linear conversion matrix calculation process comprising:
generating a second predetermined number of matrices;
extracting a third predetermined number of vectors from the second predetermined number of matrices, the third predetermined number of vectors being randomly selected;
determining whether the third predetermined number of vectors are linearly independent; and
outputting, after determining that the third predetermined number of vectors are linearly independent, at least one of the second predetermined number of matrices as the linear conversion matrix.

2. The cryptographic processing system of claim 1, wherein:
the linear conversion matrix is an MDS matrix.

3. The cryptographic processing system of claim 1, wherein:
the second predetermined number of matrices are generated randomly.

4. The cryptographic processing system of claim 1, wherein:
determining whether the third predetermined number of vectors are linearly independent comprises determining whether a determinant of a matrix comprising the third predetermined number of vectors is nonzero.

5. The cryptographic processing system of claim 1, wherein:
outputting at least one of the second predetermined number of matrices as the linear conversion matrix comprises:
outputting the second predetermined number of matrices in a predetermined first order as linear conversion matrices for odd numbers of consecutive rounds of transformation; and
outputting the second predetermined number of matrices in a predetermined second order as linear conversion matrices for even numbers of consecutive rounds of transformation.

6. The cryptographic processing system of claim 5, wherein:
the second predetermined order is reverse of the first predetermined order.

7. A cryptographic processing system, comprising:
a processor; and
a memory storing a program that when executed by the processor, performs a first predetermined number of rounds of transformations, each round of transformation comprising:
performing, by a nonlinear conversion layer, a nonlinear transformation of input information and outputs first output information; and
performing, by a linear conversion layer, a linear transformation of the first output information based on a linear conversion matrix,
wherein the program performs a linear conversion matrix calculation process comprising:
generating a second predetermined number of matrices;
extracting a third predetermined number of vectors from the second predetermined number of matrices, the third predetermined number of vectors being randomly selected;

determining whether the third predetermined number of vectors constitute a square matrix and that a determinant of any sub-matrix of the square matrix is nonzero; and outputting, after determining that the third predetermined number of vectors constitute a square matrix and that a determinant of any sub-matrix of the square matrix is nonzero, at least one of the second predetermined number of matrices as the linear conversion matrix.

8. The cryptographic processing system of claim 7, wherein:
the linear conversion matrix is an MDS matrix.

9. The cryptographic processing system of claim 7, wherein:
the second predetermined number of matrices are generated randomly.

10. The cryptographic processing system of claim 7, wherein:
outputting at least one of the second predetermined number of matrices as the linear conversion matrix comprises:
outputting the second predetermined number of matrices in a predetermined first order as linear conversion matrices for odd numbers of consecutive rounds of transformation; and
outputting the second predetermined number of matrices in a predetermined second order as linear conversion matrices for even numbers of consecutive rounds of transformation.

11. The cryptographic processing system of claim 10, wherein:
the second predetermined order is reverse of the first predetermined order.

12. A cryptographic processing system, comprising:
a processor; and
a memory storing a program that when executed by the processor, performs a first predetermined number of rounds of transformations, each round of transformation comprising:
performing, by a nonlinear conversion layer, a nonlinear transformation of input information and outputs first output information; and
performing, by a linear conversion layer, a linear transformation of the first output information based on a linear conversion matrix,
wherein the program performs a linear conversion matrix calculation process comprising:
generating a first matrix;
extracting a second predetermined number of vectors from the first matrix and forming a second matrix comprising the second predetermined number of vectors, the second predetermined number of vectors being randomly selected;
dividing the second matrix into a third predetermined number of matrices; and
outputting at least one of the third predetermined number of matrices as the linear conversion matrix.

13. The cryptographic processing system of claim 12, wherein:
the linear conversion matrix is an MDS matrix.

14. The cryptographic processing system of claim 12, wherein:
extracting the second predetermined number of vectors from the first matrix and forming the second matrix comprises extracting the second predetermined number of rows from the first matrix and forming the second matrix comprising the second predetermined number of rows.

15. The cryptographic processing system of claim 14, wherein:
dividing the second matrix into the third predetermined number of matrices comprises dividing the second matrix randomly into the third predetermined number of matrices, each of the third predetermined number of matrices including the same number of rows as the second matrix and equal number of columns.

16. The cryptographic processing system of claim 12, wherein:
outputting at least one of the third predetermined number of matrices as the linear conversion matrix comprises:
outputting the third predetermined number of matrices in a predetermined first order as linear conversion matrices for odd numbers of consecutive rounds of transformation; and
outputting the third predetermined number of matrices in a predetermined second order as linear conversion matrices for even numbers of consecutive rounds of transformation.

17. The cryptographic processing system of claim 16, wherein:
the second predetermined order is reverse of the first predetermined order.

18. A cryptographic processing system, comprising:
a processor; and
a memory storing a program that when executed by the processor, performs a first predetermined number 2r of rounds of transformations, r being an integer, each round of transformation comprising:
performing, by a nonlinear conversion layer, a nonlinear transformation of input information and outputs first output information; and
performing, by a linear conversion layer, a linear transformation of the first output information based on a linear conversion matrix,
wherein the program performs a linear conversion matrix calculation process comprising:
generating a second predetermined number q of matrices, q being an integer smaller than r;
extracting a third predetermined number of vectors from the second predetermined number of matrices, the third predetermined number of vectors being randomly selected;
determining whether the third predetermined number of vectors are linearly independent; and
outputting, after determining that the third predetermined number of vectors are linearly independent, at least one of the second predetermined number of matrices as the linear conversion matrix.

19. The cryptographic processing system of claim 18, wherein:
the linear conversion matrix is an MDS matrix.

20. The cryptographic processing system of claim 18, wherein:
determining whether the third predetermined number of vectors are linearly independent comprises determining whether a determinant of a matrix comprising the third predetermined number of vectors is nonzero.

21. The cryptographic processing system of claim 18, wherein:
outputting at least one of the second predetermined number of matrices as the linear conversion matrix comprises:

outputting the second predetermined number q of matrices in a first predetermined order as a first group of linear conversion matrices repeatedly employed for odd numbers of rounds of transformations, and
outputting the second predetermined number q of matrices in a second predetermined order as a second group of linear conversion matrices repeatedly employed for even numbers of rounds of transformations.

22. The cryptographic processing system of claim 21, wherein:
the second predetermined order is reverse of the first predetermined order.

23. A cryptographic processing system, comprising:
a processor; and
a memory storing a program that when executed by the processor, performs a first predetermined number 2r of rounds of transformations, r being an integer, each round of transformation comprising:
performing, by a nonlinear conversion layer, a nonlinear transformation of input information and outputs first output information; and
performing, by a linear conversion layer, a linear transformation of the first output information based on a linear conversion matrix,
wherein the program performs a linear conversion matrix calculation process comprising:
generating a second predetermined number q of matrices, q being an integer smaller than r;
extracting a third predetermined number of vectors from the second predetermined number of matrices, the third predetermined number of vectors being randomly selected;
determining whether the third predetermined number of vectors constitute a square matrix and that a determinant of any sub-matrix of the square matrix is nonzero; and
outputting, after determining that the third predetermined number of vectors constitute a square matrix and that a determinant of any sub-matrix of the square matrix is nonzero, at least one of the second predetermined number of matrices as the linear conversion matrix.

24. The cryptographic processing system of claim 23, wherein:
the linear conversion matrix is an MDS matrix.

25. The cryptographic processing system of claim 23, wherein:
the second predetermined number of matrices are generated randomly.

26. The cryptographic processing system of claim 23, wherein:
outputting at least one of the second predetermined number of matrices as the linear conversion matrix comprises:
outputting the second predetermined number of matrices in a predetermined first order as linear conversion matrices for odd numbers of consecutive rounds of transformation; and
outputting the second predetermined number of matrices in a predetermined second order as linear conversion matrices for even numbers of consecutive rounds of transformation.

27. The cryptographic processing system of claim 26, wherein:
the second predetermined order is reverse of the first predetermined order.

28. A cryptographic processing system, comprising:
a processor; and
a memory storing a program that when executed by the processor, performs a first predetermined number 2r of rounds of transformations, r being an integer, each round of transformation comprising:
performing, by a nonlinear conversion layer, a nonlinear transformation of input information and outputs first output information; and
performing, by a linear conversion layer, a linear transformation of the first output information based on a linear conversion matrix,
wherein the program performs a linear conversion matrix calculation process comprising:
generating a first matrix;
extracting a second predetermined number of vectors from the first matrix, the second predetermined number of vectors being randomly selected and forming a second matrix;
dividing the second matrix into a third predetermined number q of matrices, q being an integer smaller than r; and
outputting at least one of the third predetermined number of matrices as the linear conversion matrix.

29. The cryptographic processing system of claim 28, wherein:
the linear conversion matrix is an MDS matrix.

30. The cryptographic processing system of claim 28, wherein:
extracting the second predetermined number of vectors from the first matrix and forming the second matrix comprises extracting the second predetermined number of rows from the first matrix and forming the second matrix comprising the second predetermined number of rows.

31. The cryptographic processing system of claim 30, wherein:
dividing the second matrix into the third predetermined number of matrices comprises dividing the second matrix randomly into the third predetermined number of matrices, each of the third predetermined number of matrices including the same number of rows as the second matrix and equal number of columns.

32. The cryptographic processing system of claim 28, wherein:
outputting at least one of the third predetermined number of matrices as the linear conversion matrix comprises:
outputting the third predetermined number of matrices in a predetermined first order as linear conversion matrices for odd numbers of consecutive rounds of transformation; and
outputting the third predetermined number of matrices in a predetermined second order as linear conversion matrices for even numbers of consecutive rounds of transformation.

33. The cryptographic processing system of claim 32, wherein:
the second predetermined order is reverse of the first predetermined order.

34. A nontransitory computer-readable storage medium encoded with a computer program, which when executed by a processor, causes a computer to perform a cryptographic processing method comprising a first predetermined number of rounds of transformations, each round of transformation comprising:
performing, by a nonlinear conversion layer, a nonlinear transformation of input information and outputs first output information; and performing, by a linear conversion layer, a linear transformation of the first output information based on a linear conversion matrix, performing a linear conversion matrix calculation process comprising:
  generating a second predetermined number of matrices;
  extracting a third predetermined number of vectors from the second predetermined number of matrices, the third predetermined number of vectors being randomly selected;
  determining whether the third predetermined number of vectors are linearly independent; and
  outputting, after determining that the third predetermined number of vectors are linearly independent, at least one of the second predetermined number of matrices as the linear conversion matrix.

35. A nontransitory computer-readable storage medium encoded with a computer program, which when executed by a processor, causes a computer to perform a cryptographic processing method comprising a first predetermined number of rounds of transformations, each round of transformation comprising:
  performing, by a nonlinear conversion layer, a nonlinear transformation of input information and outputs first output information; and
  performing, by a linear conversion layer, a linear transformation of the first output information based on a linear conversion matrix,
  performing a linear conversion matrix calculation process comprising:
    generating a second predetermined number of matrices;
    extracting a third predetermined number of vectors from the second predetermined number of matrices, the third predetermined number of vectors being randomly selected;
    determining whether the third predetermined number of vectors constitute a square matrix and that a determinant of any sub-matrix of the square matrix is nonzero; and
    outputting, after determining that the third predetermined number of vectors constitute a square matrix and that a determinant of any sub-matrix of the square matrix is nonzero, at least one of the second predetermined number of matrices as the linear conversion matrix.

36. A nontransitory computer-readable storage medium encoded with a computer program, which when executed by a processor, causes a computer to perform a cryptographic processing method comprising a first predetermined number of rounds of transformations, each round of transformation comprising:
  performing, by a nonlinear conversion layer, a nonlinear transformation of input information and outputs first output information; and
  performing, by a linear conversion layer, a linear transformation of the first output information based on a linear conversion matrix,
  performing a linear conversion matrix calculation process comprising:
    generating a first matrix;
    extracting a second predetermined number of vectors from the first matrix and forming a second matrix comprising the second predetermined number of vectors, the second predetermined number of vectors being randomly selected;
    dividing the second matrix into a third predetermined number of matrices; and
    outputting at least one of the third predetermined number of matrices as the linear conversion matrix.

37. A nontransitory computer-readable storage medium encoded with a computer program, which when executed by a processor, causes a computer to perform a cryptographic processing method comprising a first predetermined number $2r$ of rounds of transformations, $r$ being an integer, each round of transformation comprising:
  performing, by a nonlinear conversion layer, a nonlinear transformation of input information and outputs first output information; and
  performing, by a linear conversion layer, a linear transformation of the first output information based on a linear conversion matrix,
  performing a linear conversion matrix calculation process comprising:
    generating a second predetermined number $q$ of matrices, $q$ being an integer smaller than $r$;
    extracting a third predetermined number of vectors from the second predetermined number of matrices, the third predetermined number of vectors being randomly selected;
    determining whether the third predetermined number of vectors are linearly independent; and
    outputting, after determining that the third predetermined number of vectors are linearly independent, at least one of the second predetermined number of matrices as the linear conversion matrix.

38. A nontransitory computer-readable storage medium encoded with a computer program, which when executed by a processor, causes a computer to perform a cryptographic processing method comprising a first predetermined number $2r$ of rounds of transformations, $r$ being an integer, each round of transformation comprising:
  performing, by a nonlinear conversion layer, a nonlinear transformation of input information and outputs first output information; and
  performing, by a linear conversion layer, a linear transformation of the first output information based on a linear conversion matrix,
  performing a linear conversion matrix calculation process comprising:
    generating a second predetermined number $q$ of matrices, $q$ being an integer smaller than $r$;
    extracting a third predetermined number of vectors from the second predetermined number of matrices, the third predetermined number of vectors being randomly selected;
    determining whether the third predetermined number of vectors constitute a square matrix and that a determinant of any sub-matrix of the square matrix is nonzero; and
    outputting, after determining that the third predetermined number of vectors constitute a square matrix and that a determinant of any sub-matrix of the square matrix is nonzero, at least one of the second predetermined number of matrices as the linear conversion matrix.

39. A nontransitory computer-readable storage medium encoded with a computer program, which when executed by a processor, causes a computer to perform a cryptographic processing method comprising a first predetermined number $2r$ of rounds of transformations, $r$ being an integer, each round of transformation comprising:
  performing, by a nonlinear conversion layer, a nonlinear transformation of input information and outputs first output information; and
  performing, by a linear conversion layer, a linear transformation of the first output information based on a linear conversion matrix, performing a linear conversion matrix calculation process comprising:
  generating a first matrix;
  extracting a second predetermined number of vectors from the first matrix, the second predetermined number of vectors being randomly selected and forming a second matrix;
  dividing the second matrix into a third predetermined number q of matrices, q being an integer smaller than r; and
  outputting at least one of the third predetermined number of matrices as the linear conversion matrix.

40. A cryptographic system, comprising:
a security encryption processing system comprising:
  a first processor;
  a first transmission/reception section performing external data communication; and
  a first memory storing a first program that when executed by the first processor:
    transforms, by a first encryption processing section, first input information into first nonlinear information and the first nonlinear information into first linear information;
    transforms, by a second encryption processing section, the first input information into second nonlinear information and the second nonlinear information to second linear information;
    performs a first XOR operation based on the first linear information and the second linear information; and
    outputs a result of the first XOR operation, wherein:
      if the first nonlinear information is expressed as a first sequence vector, the first linear information is expressed as a second sequence vector, the second nonlinear information is expressed as a third sequence vector, and the second linear information is expressed as a fourth sequence vector,
      then a first matrix indicating transformation from the first sequence vector to the second sequence vector is different than a second matrix indicating transformation from the third sequence vector to the fourth sequence vector; and
a security decryption processing system comprising:
  a second processor;
  a second transmission/reception section performing external data communication; and
  a second memory storing a second program that when executed by the second processor:
    transforms, by a first decryption processing section, second input information into third nonlinear information and the third nonlinear information into third linear information;
    transforms, by a second decryption processing section, the second input information into fourth nonlinear information and the fourth nonlinear information to fourth linear information;
    performs a second XOR operation based on the third linear information and the fourth linear information; and
    outputs a result of the second XOR operation, wherein:
      if the third nonlinear information is expressed as a fifth sequence vector, the third linear information is expressed as a sixth sequence vector, the fourth nonlinear information is expressed as a seventh sequence vector, and the fourth linear information is expressed as a eighth sequence vector,
      then a third matrix indicating transformation from the fifth sequence vector to the sixth sequence vector is different than a fourth matrix indicating transformation from the seventh sequence vector to the eighth sequence vector.

41. A communication network system, comprising:
a security encryption processing system comprising:
  a first processor;
  a first transmission/reception section performing external data communication; and
  a first memory storing a first program that when executed by the first processor:
    transforms, by a first encryption processing section, first input information into first nonlinear information and the first nonlinear information into first linear information;
    transforms, by a second encryption processing section, the first input information into second nonlinear information and the second nonlinear information to second linear information;
    performs a first XOR operation based on the first linear information and the second linear information; and
    outputs a result of the first XOR operation, wherein:
      if the first nonlinear information is expressed as a first sequence vector, the first linear information is expressed as a second sequence vector, the second nonlinear information is expressed as a third sequence vector, and the second linear information is expressed as a fourth sequence vector,
      then a first matrix indicating transformation from the first sequence vector to the second sequence vector is different than a second matrix indicating transformation from the third sequence vector to the fourth sequence vector; and
a security decryption processing system comprising:
  a second processor;
  a second transmission/reception section performing external data communication; and
  a second memory storing a second program that when executed by the second processor:
    transforms, by a first decryption processing section, second input information into third nonlinear information and the third nonlinear information into third linear information;
    transforms, by a second decryption processing section, the second input information into fourth nonlinear information and the fourth nonlinear information to fourth linear information;
    performs a second XOR operation based on the third linear information and the fourth linear information; and
    outputs a result of the second XOR operation, wherein:
      if the third nonlinear information is expressed as a fifth sequence vector, the third linear information is expressed as a sixth sequence vector, the fourth nonlinear information is expressed as a seventh sequence vector, and the fourth linear information is expressed as a eighth sequence vector,
      then a third matrix indicating transformation from the fifth sequence vector to the sixth sequence vector is different than a fourth matrix indicating transformation from the seventh sequence vector to the eighth sequence vector.

* * * * *